United States Patent [19]

Futami et al.

[11] Patent Number: 5,187,665
[45] Date of Patent: Feb. 16, 1993

[54] VEHICLE EQUIPMENT POSITION CONTROL SYSTEM AND THE METHOD THEREFOR

[75] Inventors: Toru Futami, Fujisawa; Kazuo Hirai, Yokohama; Shigeki Tezuka, Tokyo, all of Japan

[73] Assignee: Nissan Motor Co., Ltd., Yokohama, Japan

[21] Appl. No.: 597,671

[22] Filed: Oct. 16, 1990

[30] Foreign Application Priority Data

Oct. 16, 1989 [JP] Japan ................................. 1-268532

[51] Int. Cl.[5] ............................................ G06F 15/20
[52] U.S. Cl. ............................... 364/424.05; 296/65.1; 318/467
[58] Field of Search ...................... 364/424.05, 424.01; 296/65.1; 318/467

[56] References Cited

U.S. PATENT DOCUMENTS

| | | | |
|---|---|---|---|
| 4,451,887 | 5/1984 | Harada et al. | 364/424.05 |
| 4,706,194 | 11/1987 | Webb et al. | 364/424.05 |
| 4,707,788 | 11/1987 | Tashiro et al. | 364/424.05 |
| 4,775,939 | 10/1988 | Nakashima et al. | 364/424.05 |
| 4,811,226 | 3/1989 | Shinohara | 364/424.05 |
| 4,812,838 | 3/1989 | Tashiro et al. | 340/825.06 |
| 4,833,614 | 5/1989 | Saitoh et al. | 364/424.05 |
| 4,853,687 | 8/1989 | Isomura et al. | 340/825.3 |
| 4,893,240 | 1/1990 | Karkonti | 364/424.05 |
| 4,922,426 | 5/1990 | Obara et al. | 364/424.05 |

FOREIGN PATENT DOCUMENTS 62-112666  7/1987  Japan .
63-158432  10/1988  Japan .

Primary Examiner—Thomas G. Black
Attorney, Agent, or Firm—Foley & Lardner

[57] ABSTRACT

The vehicle seat and the steering wheel are shifted to the drive position when the door is open and to the getting in/out position when the door is opened, as long as the ignition key is inserted into the key cylinder without shifting the key at the accessory and ignition positions. Further, the seat and wheel are shifted to the drive position when the key is inserted into the key cylinder and to the getting in/out position when the key is removed therefrom, as long as the key is not shifted at the accessory and ignition positions. Further, the seat and wheel are shifted to the drive position when the key is shifted to the ignition position, as long as the key is inserted into the key cylinder and shifted at the accessory position. Furthermore, the seat and wheel are shifted to the drive position under door-closed condition and to the getting in/out position under door-open condition, when the key is shifted from the accessory position to the lock position, as long as the key is inserted into the key cylinder and not shifted at the ignition position.

16 Claims, 16 Drawing Sheets

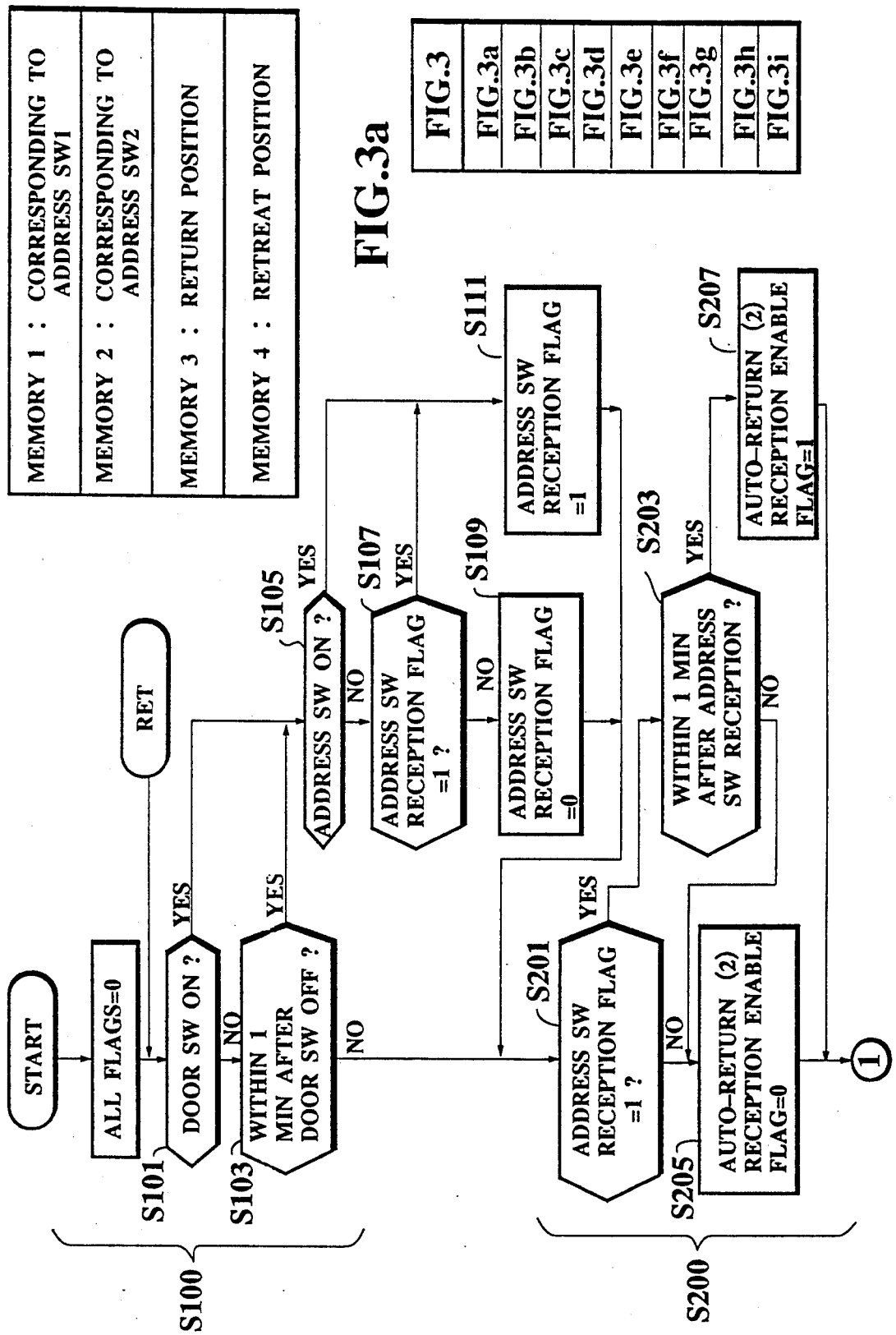

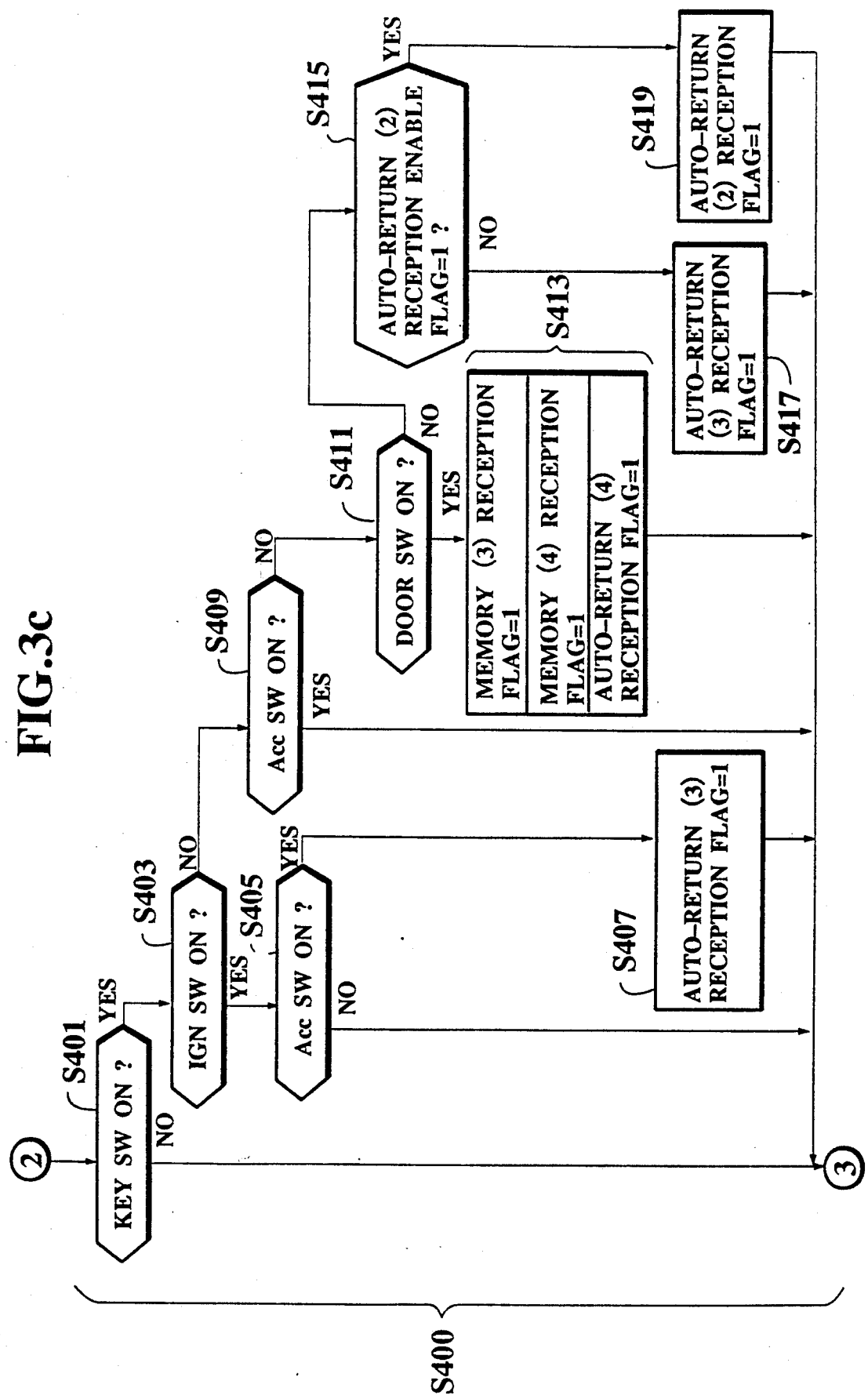

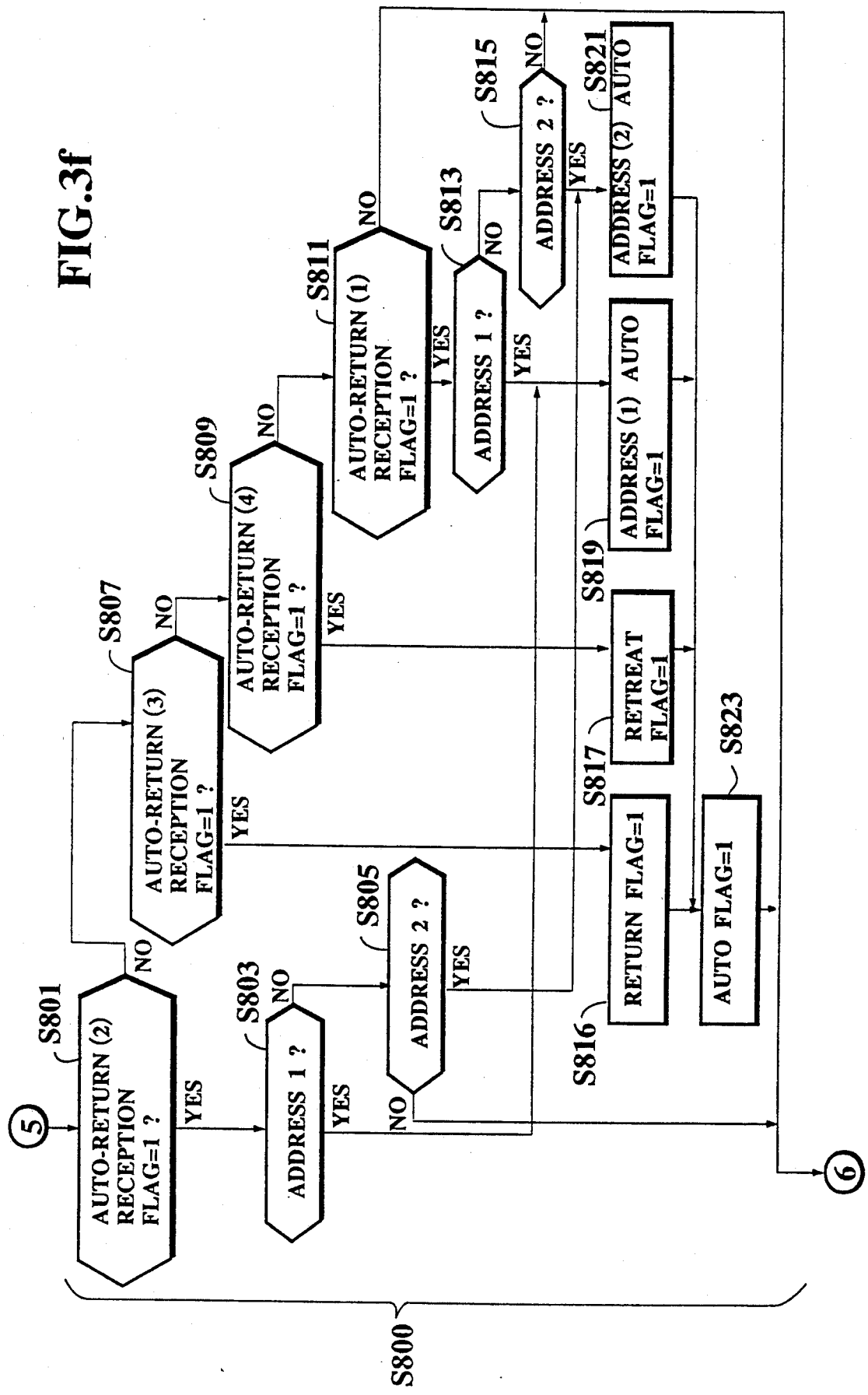

VEHICLE EQUIPMENT POSITION CONTROL SYSTEM AND THE METHOD THEREFOR

BACKGROUND OF THE INVENTION

1. Field of the Invention

The present invention is directed to a vehicle equipment position control system and the method for shifting positions of vehicle equipment such as a driver seat and a steering wheel from a drive position to a getting in/out position or vice versa, in order to facilitate driver's getting in and out.

2. Description of the Prior Art

An example of a prior-art vehicle equipment position control apparatus is disclosed in Japanese Published Unexamined (Kokai) Utility Model Appli. No. 63-158432. In this prior-art apparatus, a vehicle seat can be moved back and forth automatically according to the door opening and closing conditions, when the passenger gets into or out of the vehicle, in order to facilitate the passenger's getting in and out of action.

In more detail, when the passenger opens a door, since a vehicle seat moves automatically rearwards, a space through which the passenger gets into or out of the car is broadened. Further, when the door is closed, the vehicle seat moves automatically frontward to locate the vehicle seat to a driving position.

In the above-mentioned prior-art apparatus, since nothing is taken into account of the mutual relationship between the door opening/closing condition and the ignition key operation, there exist various problems as follows:

For instance, the driver often stops the engine by turning an ignition key to a lock position (key removal position) at a gasoline service station, while gasoline is being refueled, without getting out of the car. Thereafter, however, when the driver opens the door to get out of the car for payment, since the power supply of the control circuit has already been turned off, it is impossible to shift the vehicle seat rearward for broadening a space in front of the vehicle seat.

Further, the driver often the door to stretch his head out to see behind him when parks the vehicle by driving it in reverse to a position close to a rear wall. In this case, however, since the door is open with the ignition key kept turned on, the vehicle seat is shifted automatically rearward, so that the driver cannot move the vehicle backwards safely.

Furthermore, the driver often turns off the ignition key to stop the engine and gets off the car at a parking place, without removing the ignition key. In this case, since the ignition key is turned off and therefore the power supply of the control circuit is kept off, the vehicle seat will not be moved backward, even if the door is open. Thus, the space in front of the vehicle seat will not be broadened to ease the driver's exit.

SUMMARY OF THE INVENTION

With these problems in mind, therefore, it is the primary object of the present invention to provide a vehicle equipment position control system which can facilitate the driver's getting in and out taking into account the mutual relationship between the door opening/closing operation and the ignition key position.

To achieve the above-mentioned object, the vehicle equipment position control system according to the present comprises: (a) vehicle equipment (Q) movable in position from a driving position to a getting-in/out position or vice versa; (b) actuating means (MO) for actuating said vehicle equipment from the driving position to the getting-in/out position or vice versa; (c) position detecting means (SC) for detecting vehicle equipment positions; (d) position storing means (ME) for storing vehicle equipment positions detected by said position detecting means; (e) door switch means (SW1) for outputting a door-open signal when a vehicle door is opened and a door-close signal when closed; (f) key switch means (SW2 to SW4) for detecting positions of an ignition key inserted into a key cylinder and outputting key position signals corresponding thereto; and (g) first control means (CON1) responsive to said door switch means and said key switch means, for controlling said actuating means so that said vehicle equipment is actuated by said actuating means to the driving position or the getting-in/out position stored in said position storing means, respectively under consideration of mutual relationship between the door open/close signals and the key position signals. Further, the key switch means comprises: (a) a key switch (SW2) for outputting a key insertion signal when a key is inserted into the key cylinder and a key-removal signal when removed therefrom; (b) an accessory switch (SW3) for outputting an accessory signal when the key is set to an accessory position and a non-accessory signal when not set thereto; and (c) an ignition switch (SW4) for outputting an ignition signal when the key is set to an ignition position and a non-ignition signal when not set thereto. In the vehicle equipment is a vehicle seat and a steering wheel. The movable positions of the vehicle seat are horizontal slide position, seat front lift position, seat rear lift position, and seat back recline position. The movable positions of the steering wheel are tilt angle and telescopic position of the steering wheel.

To achieve the above-mentioned object, the method of shifting vehicle equipment from a drive position to a getting-in/out position or vice versa, according to the present invention, comprises the steps of: (a) moving vehicle equipment to a driving position and a getting-in/out position; (b) detecting the moved driving position and the getting-in/out position; (c) storing the detected driving position and the detected getting-in/out position in a memory (3, 4); (d) checking whether a door is opened or closed; (e) checking whether an ignition key is inserted into a key cylinder and where the key is shifted; and (f) returning the vehicle equipment to the stored driving position or retreating the vehicle equipment to the stored getting-in/out position in association with mutual relationship between the door open/closed condition and the ignition key position. The key insertion and shift position checking steps comprises: (a) checking whether the key is inserted into the key cylinder; (b) checking whether the key is shifted to an accessory position; (c) checking whether the key is shifted to an ignition position; and (d) checking whether the key is shifted to a key lock position.

In the door open/close mode, the vehicle equipment is shifted to the drive position when the door is closed and to the getting-in/out position when the door is opened, as long as the key is inserted into the key cylinder but not shifted at the accessory and ignition positions.

In the key insertion/removal mode, the vehicle equipment is shifted to the drive position when the key is inserted into the key cylinder and to the getting-in/out position when the key is removed therefrom, as long as the key is not shifted at the accessory and ignition positions.

In the ignition mode, the vehicle equipment is shifted to the drive position when the key is shifted to the ignition position, as long as the key is inserted into the key cylinder and shifted at the accessory position.

In the key lock position mode, the vehicle equipment is shifted to the drive position if the door is closed and to the getting-in/out position if the door is opened when the key is shifted from the accessory position to the lock position, as long as the key is inserted into the key cylinder and not shifted at the ignition position.

In the vehicle equipment control system according to the present invention, when the driver stops the engine by turning the ignition key to the lock position at a gasoline station for refueling without getting out of the vehicle and thereafter when he opens the door to get out of the vehicle for payment after refueling, the seat and the steering wheel are retreated to the getting-in/out position (in door open mode), thus facilitating the exiting motion of the driver from the vehicle through a broad space. Under these conditions, when he enters the vehicle and closes the door, the seat and the steering wheel can be returned to the drive position automatically (in the door close mode).

Further, when the driver opens the door on condition that the ignition key is kept set at the lock position, as it would when he gets off the vehicle at a parking place, the seat and the steering wheel are retreated to the getting-in/out position (in door open mode). Further, when the driver gets in the vehicle and then closes the door, the seat and the steering wheel are returned to the drive position, respectively (in door close mode).

Further, the above door open/close mode is basically the same as the key lock position mode when the sequence of the door open/close and the key shift operation is disregarded.

Further, when the driver removes the ignition key from the key cylinder before opening the door to get out of the vehicle, the seat and the steering wheel are retreated to the getting-in/out position (in key removal mode). Further, when he enters the vehicle and inserts the ignition key into the key cylinder before closing the door, the seat and the steering wheel are returned to the drive position (in key insertion mode), irrespective of the door open/close condition, at high response speed, thus improving the operation feeling of the vehicle equipment shifting motion.

Further, when the driver parks the vehicle by driving it in reverse to a position at which the vehicle tail end is close to a rear wall, he opens the door to stretch his head out to assess his position. In this case, however, since the ignition switch is kept turned on, the seat and the steering wheel remain in the drive position (in ignition mode), thus allowing the driver to park the vehicle smoothly.

Further, in case the door is closed imperfectly in spite of the fact that the driver has closed the door, since the door switch is kept turned on, even if the key is inserted into the key cylinder, the seat and the steering wheel are not returned to the driving position (in door close mode), so that the driver will realize that the door is not closed securely. In this case, since the seat and the steering wheel are both returned to the driving position when the ignition switch is turned on (in ignition mode) before the door is closed perfectly, it is possible to allow the driver to quickly ignite the engine and close the door.

DETAILED DESCRIPTION OF THE PREFERRED EMBODIMENTS

The vehicle equipment position control system and the method according to the present invention will be described hereinbelow in detail with reference to the attached drawing.

Figure 1:
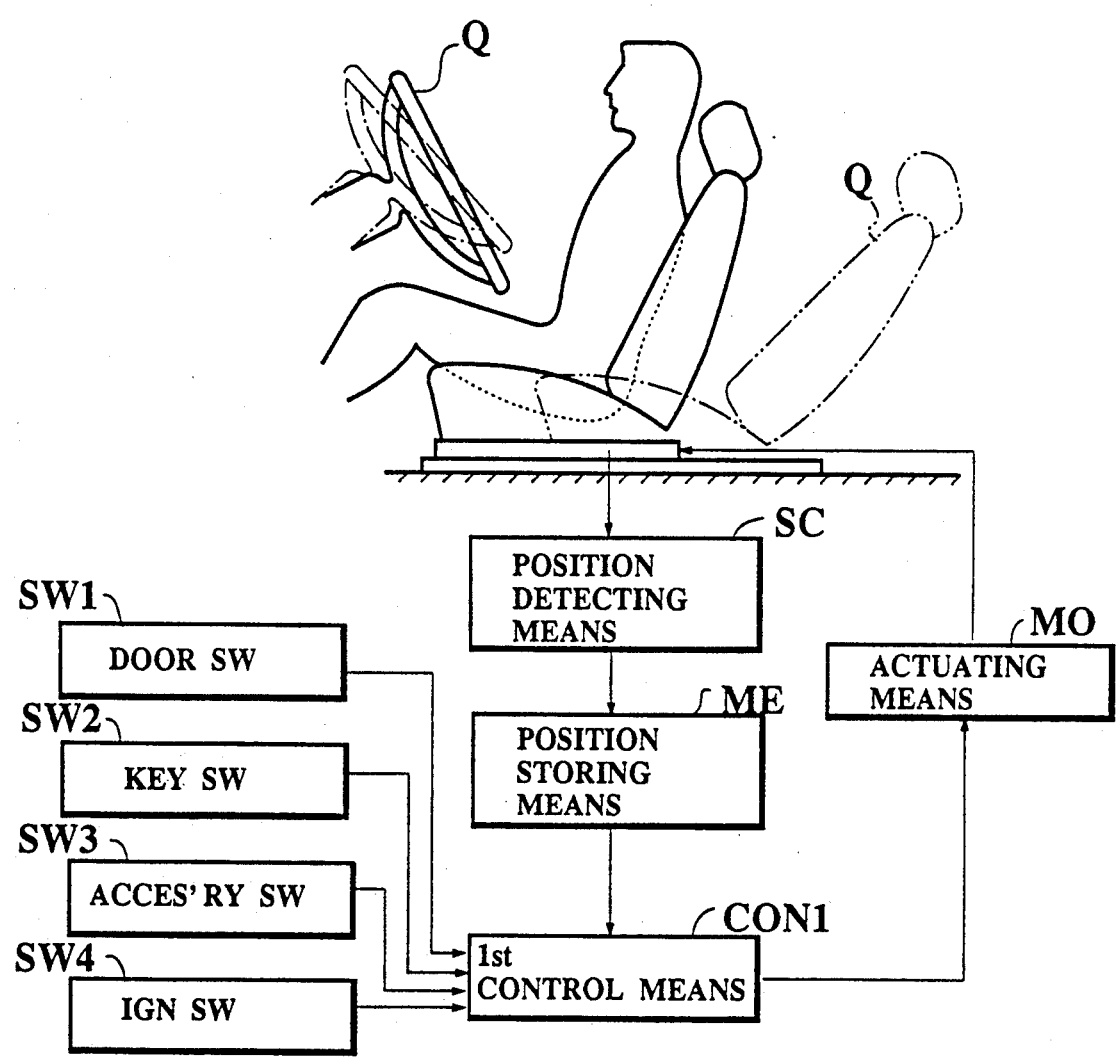
FIG. 1(A) is a schematic block diagram of a first basic concept of the vehicle equipment position control system according to the present invention.
FIG. 1(B) is a similar block diagram of a second basic concept of the system according to the present invention.
Figure 1:
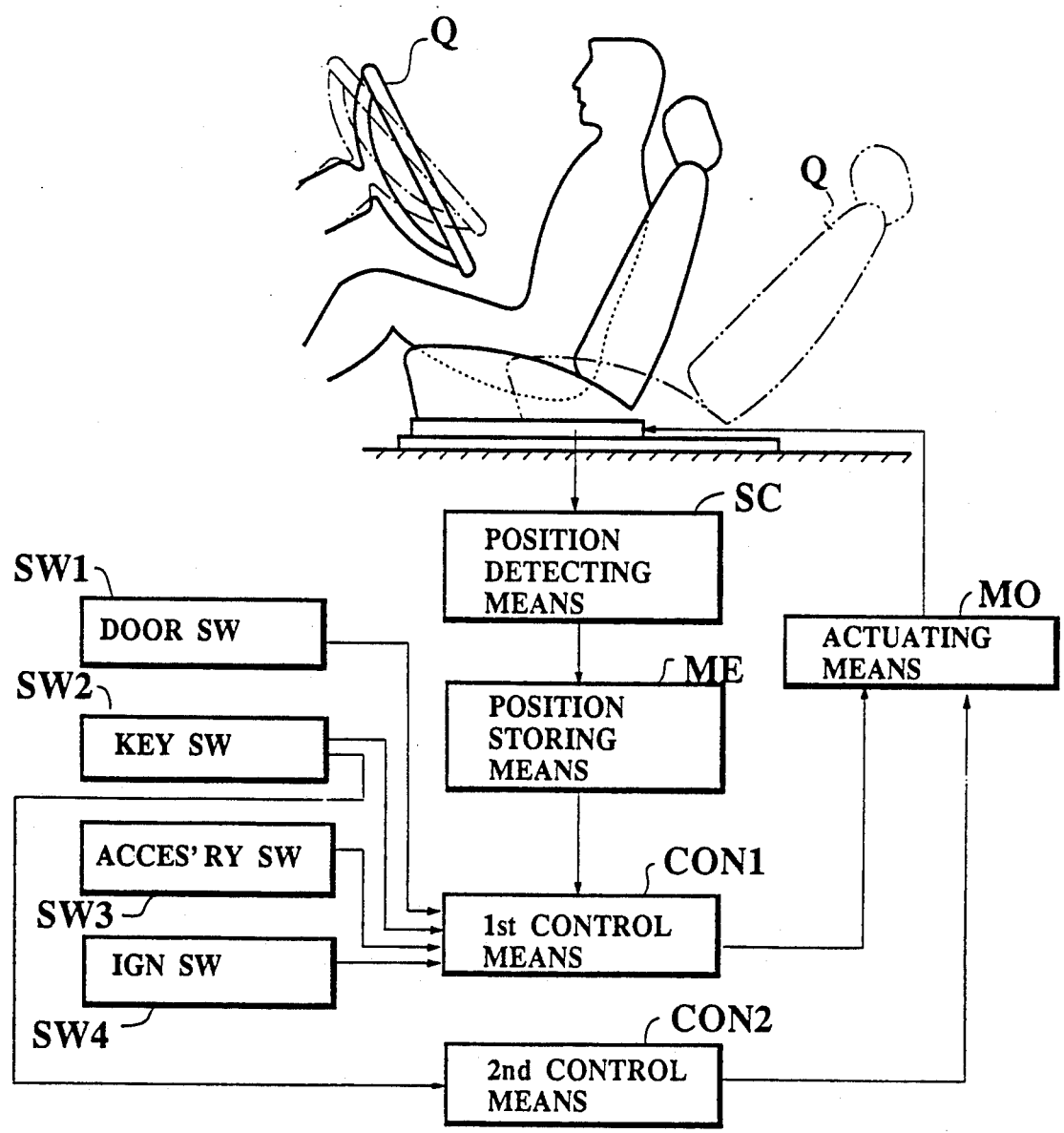

FIG. 1(A) shows a first embodiment of the system according to the present invention vehicle equipment Q, such as a vehicle seat and a steering wheel, is movable in position from a predetermined driving position to a getting-in/out position or vice versa. Actuating means MO actuates the position of the vehicle equipment Q. Position detecting means SC detects vehicle equipment positions. Position storing means ME stores the vehicle equipment positions detected by the position detecting means SC. A door switch SW1 detects the opening/closing of a door. Control means CON1 controls the driving means in such a manner that the vehicle equipment is retreated to the getting-in/out position stored by the position storing means ME in response to a door-open signal of the door switch SW1 and to a driving position in response to a door-close signal thereof on condition that a key switch SW2 is turned on and that an accessory switch SW3 and an ignition switch SW4 are both turned off.

FIG. 1(B) shows a second embodiment of the system according to the present invention. Vehicle equipment Q is movable in position from a predetermined driving position to a getting-in/out position or vice versa. Actuating means MO actuates the position of the vehicle equipment Q. Position detecting means SC detects the vehicle equipment positions. Position storing means ME stores the vehicle equipment positions detected by the position detecting means SC. A door switch SW1 detects the opening/closing of a door. First control means CON1 controls the driving means in such a manner that the vehicle equipment is retreated to the getting-in/out position stored by the position storing means ME in response to a door-open signal of the door switch SW1 and to a driving position in response to a door-close signal thereof on condition that a key switch SW2 is turned on and that an accessory switch SW3 and an ignition switch SW4 are both turned off. Second control means CON2 controls the driving means MO in such a manner that the vehicle equipment is retreated to the getting-in/out position stored by the position storing means when an ignition key is removed from a key cylinder and to a driving position when the ignition key is inserted therein.

According to the first embodiment shown in FIG. 1(A) (Door open/close mode), when the key switch SW2 is on and the accessory switch SW3 and the ignition switch SW4 are both off; that is, when the door is opened after the engine has been stopped but the ignition key is kept inserted at the lock position, the position of the vehicle equipment Q is retreated to a getting-in/out position stored in the position storing means ME in response to a door-open signal of the door switch SW1 by the actuating means MO controlled by the control means CON1, so that a space through which the driver gets out of the car is broadened. Further, when the door is closed, the vehicle seat is returned to the driving position in response to a door-close signal.

Further, in the second embodiment shown in FIG. 1(B) (Key insertion/removal mode), since the second control means CON2 further controls the actuating means MO, when the ignition key is removed from the key cylinder even if the door is kept closed, the vehicle equipment Q is retreated to a getting-in/out position. Further, when the ignition key is inserted, the vehicle equipment Q is returned to the driving position.

Further, in the third embodiment shown in FIG. 1(A) (Ignition mode), when the key is shifted to the ignition position, the vehicle equipment is returned to the drive position.

Figure 2A:
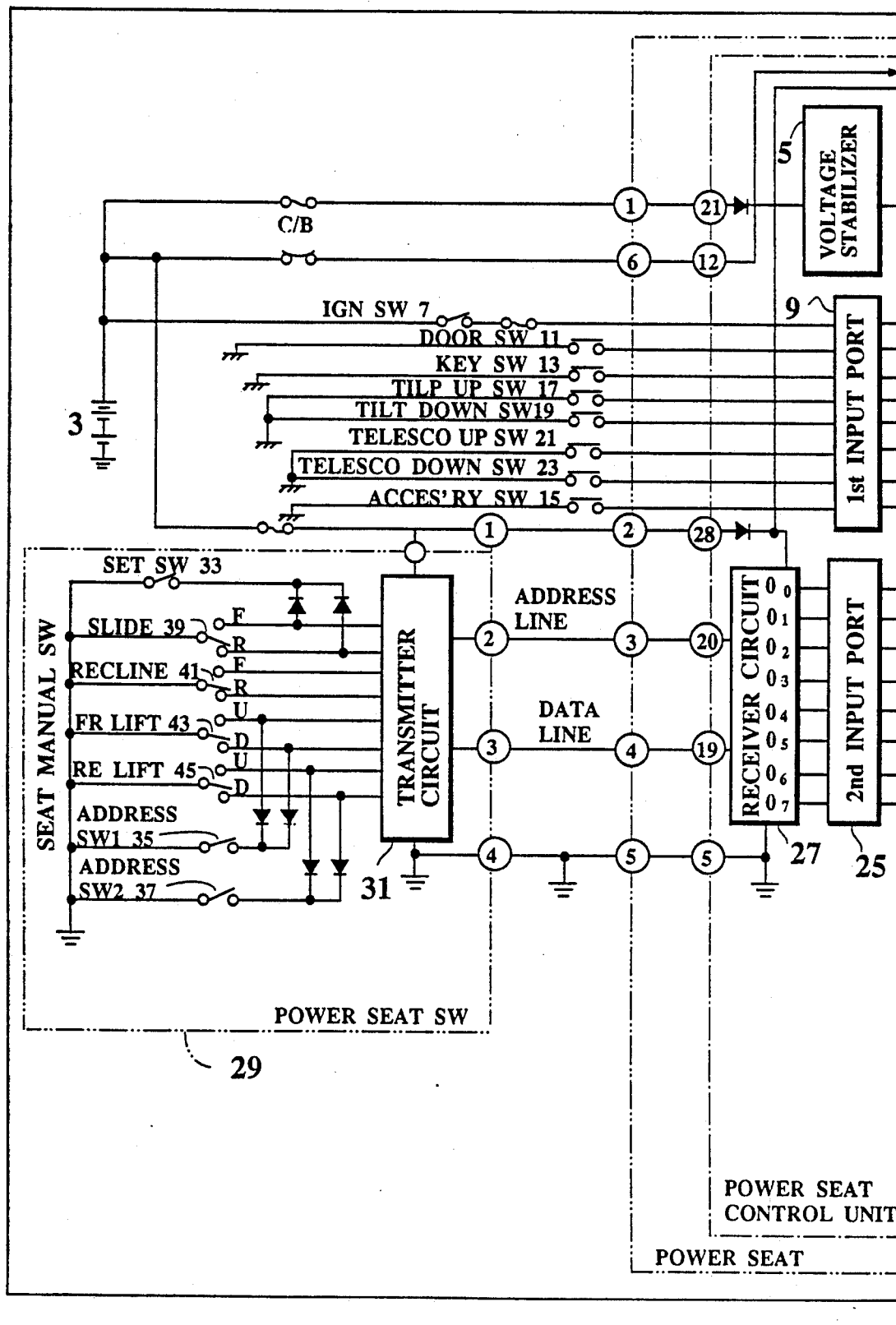
FIG. 2 (composed of FIGS. 2(A) and (B)) is an actual example of circuit configuration of one embodiment of the system according to the present invention.
Figure 2B:
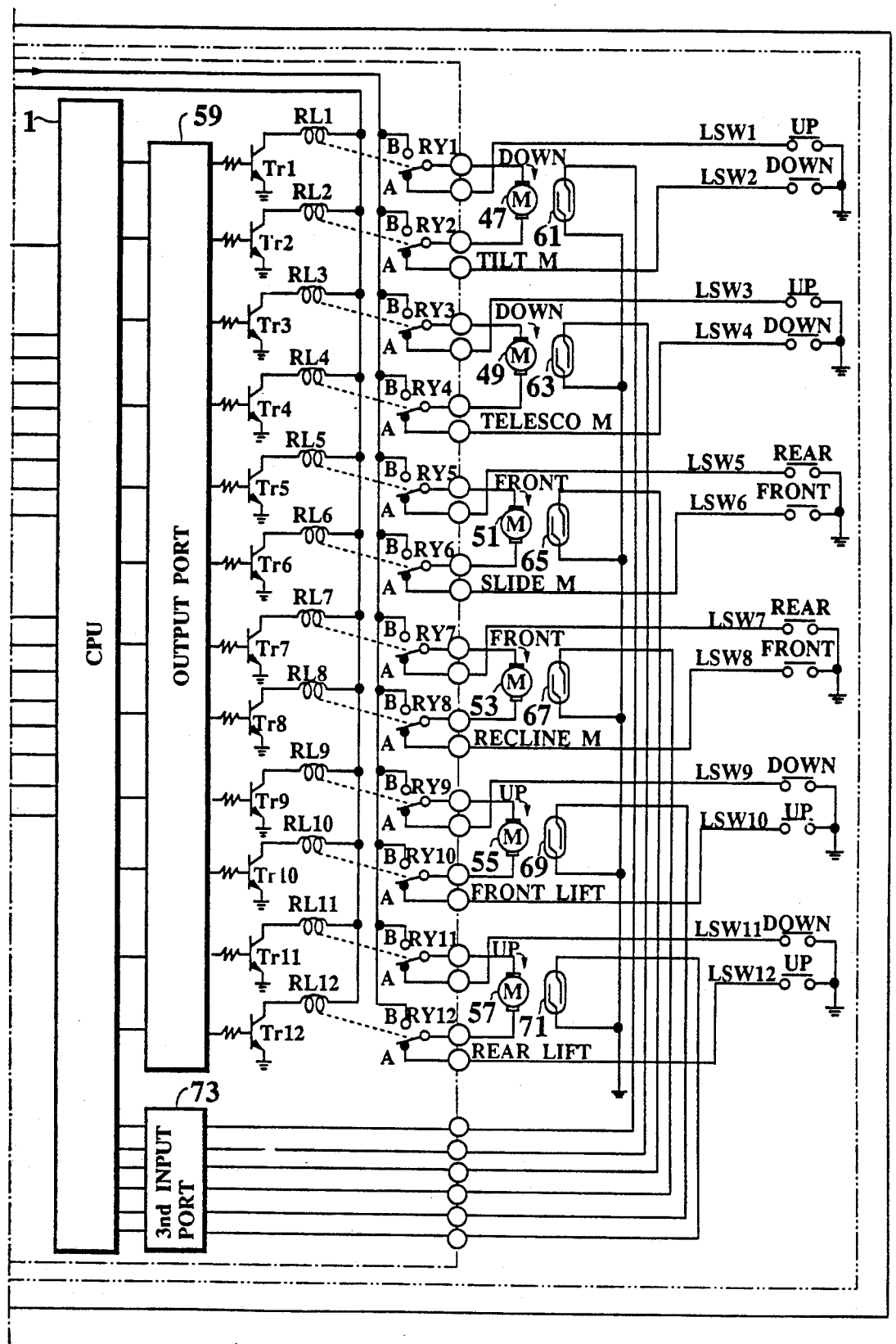
Figure 3B:
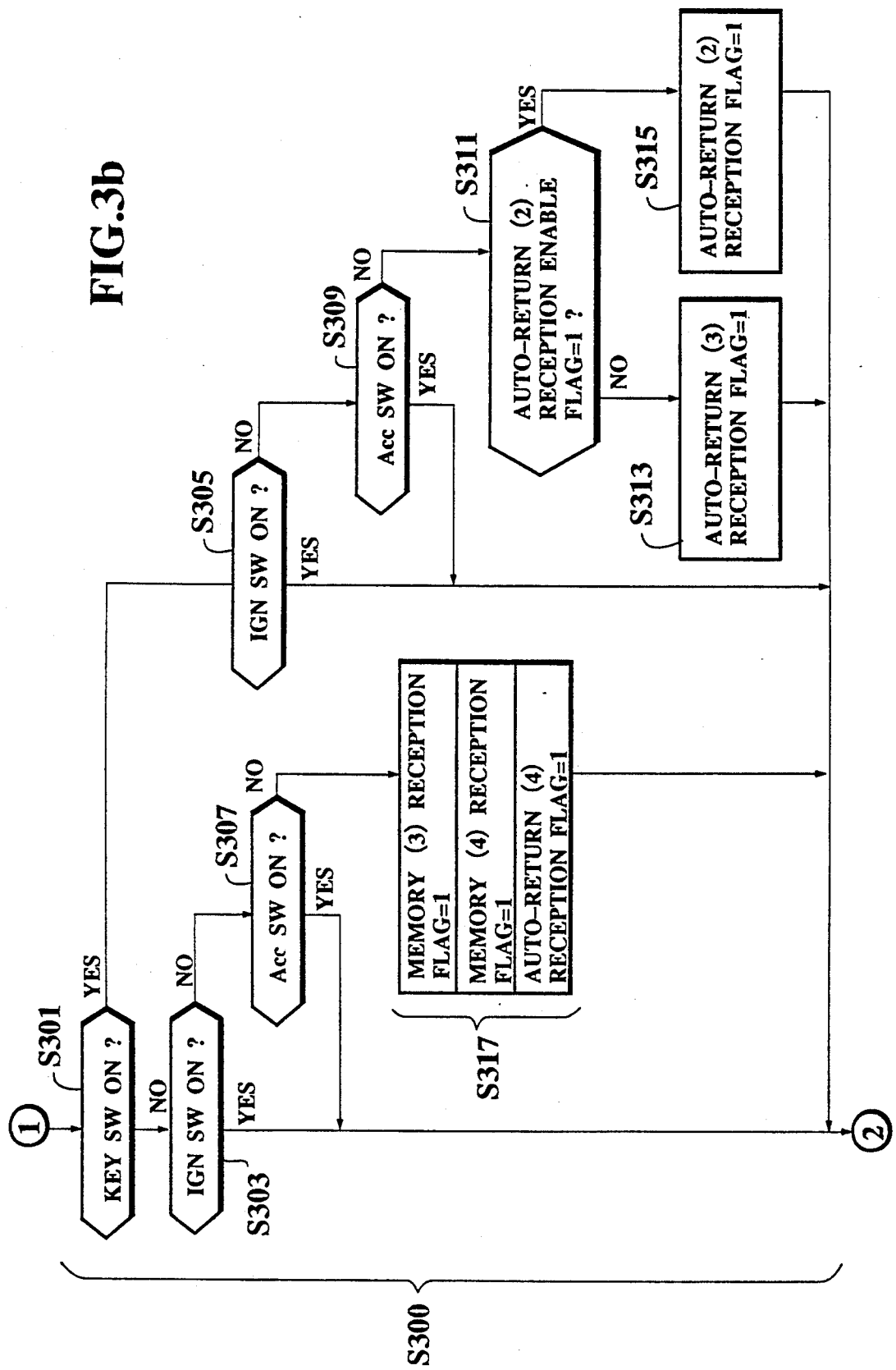
FIG. 3 (composed of FIG. 3a to 3i) is a flowchart showing the operation of one embodiment of the control method according to the present invention.
Figure 3D:
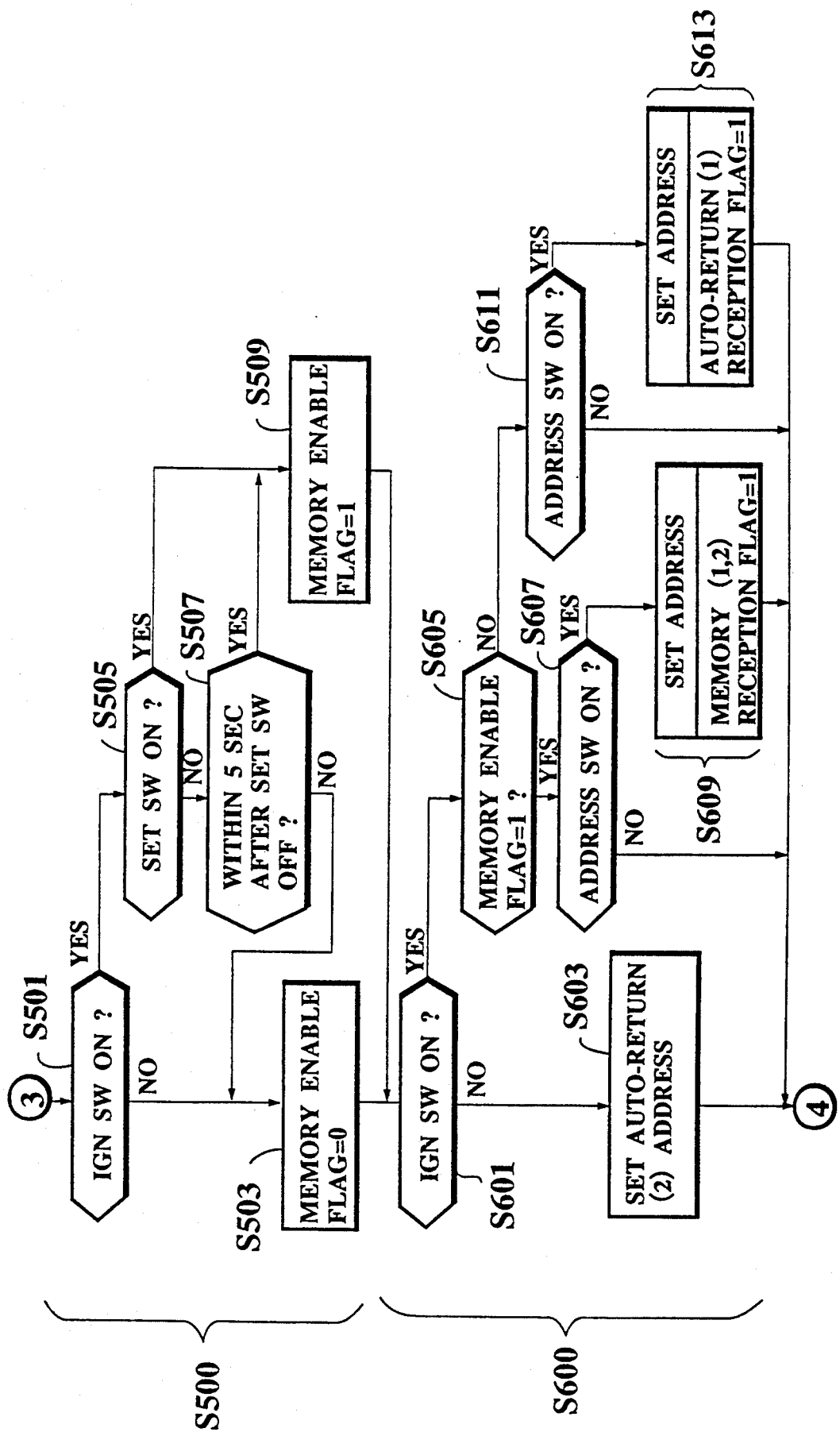
Figure 3E:
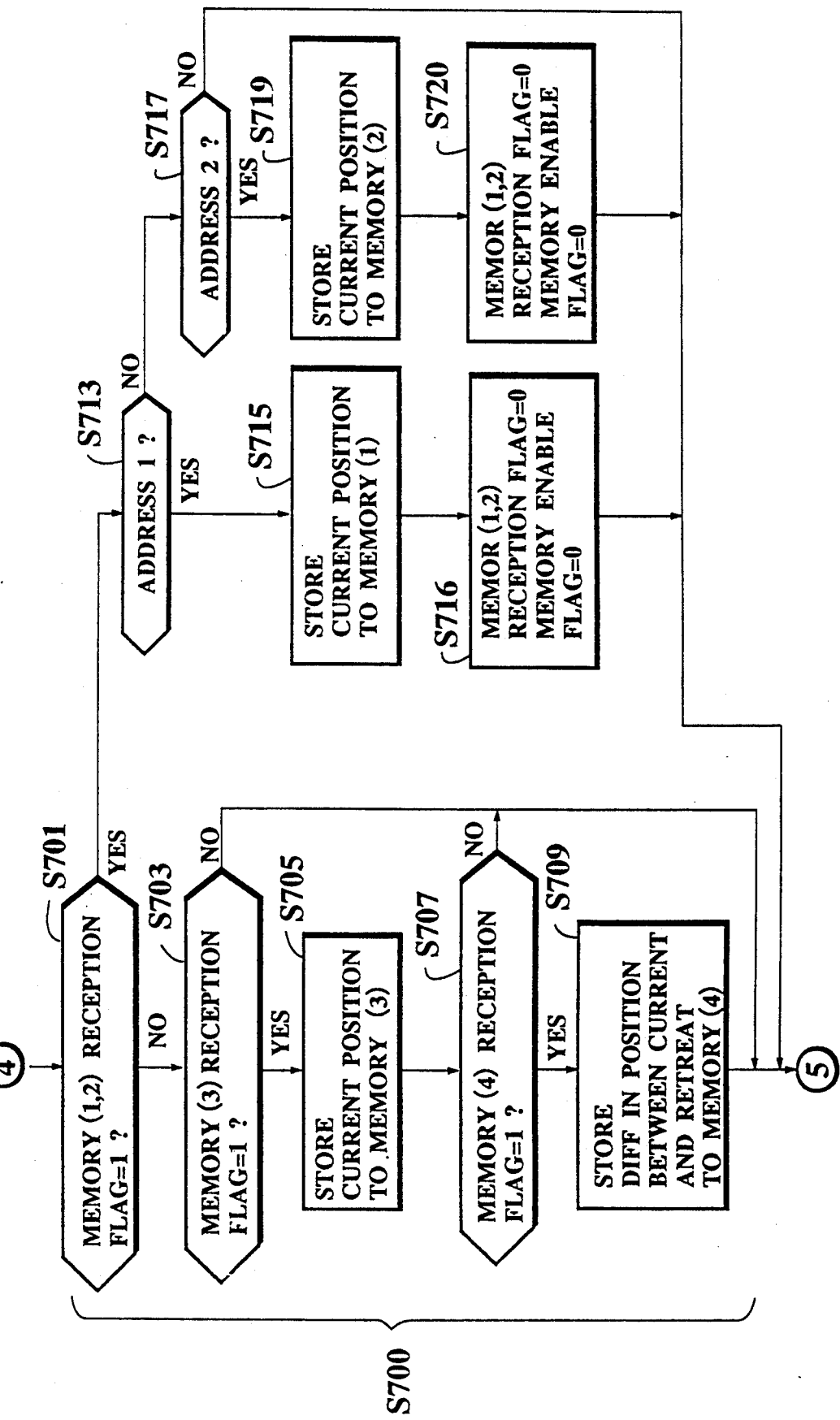
Figure 3G:
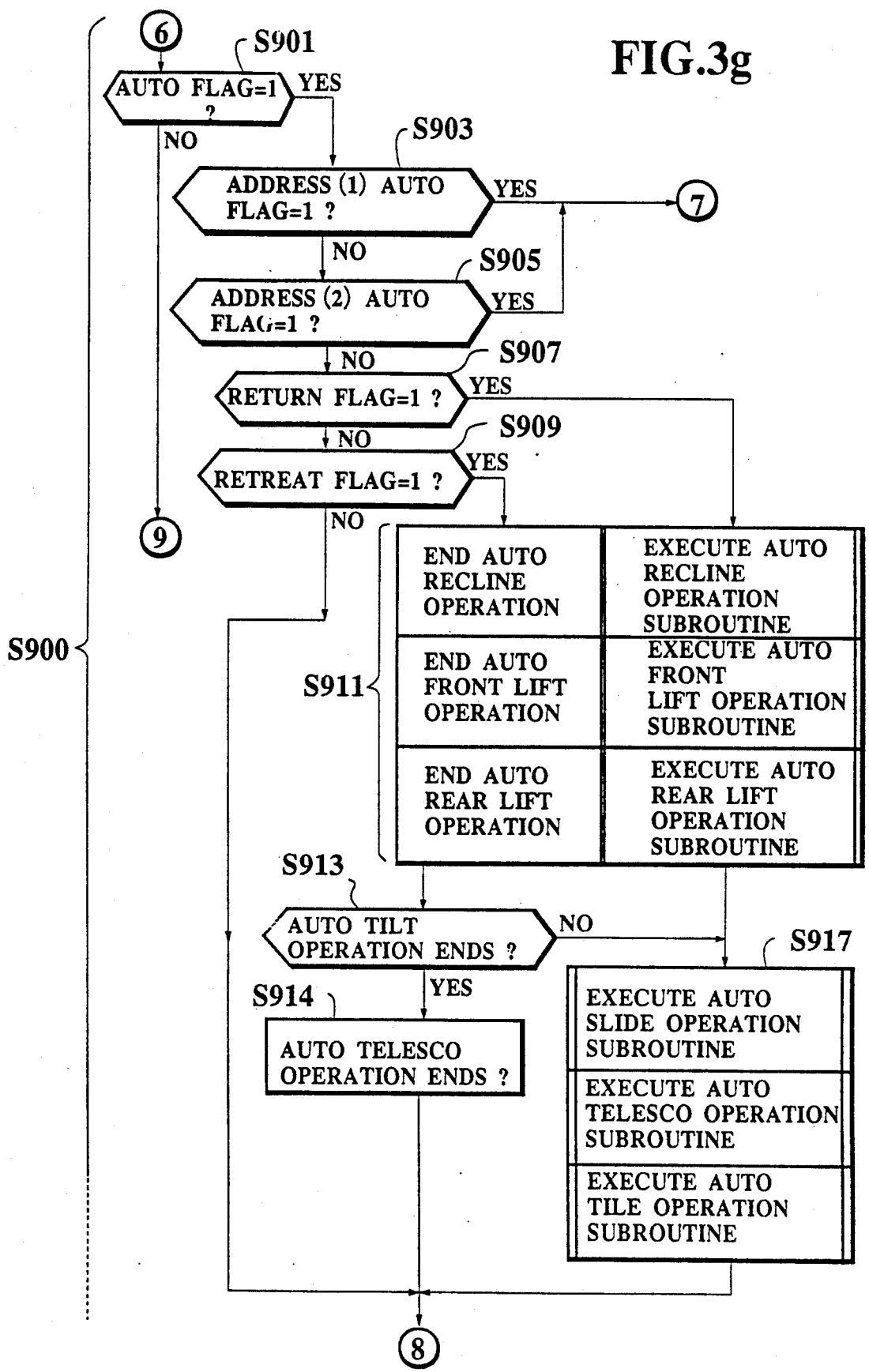
Figure 3H:
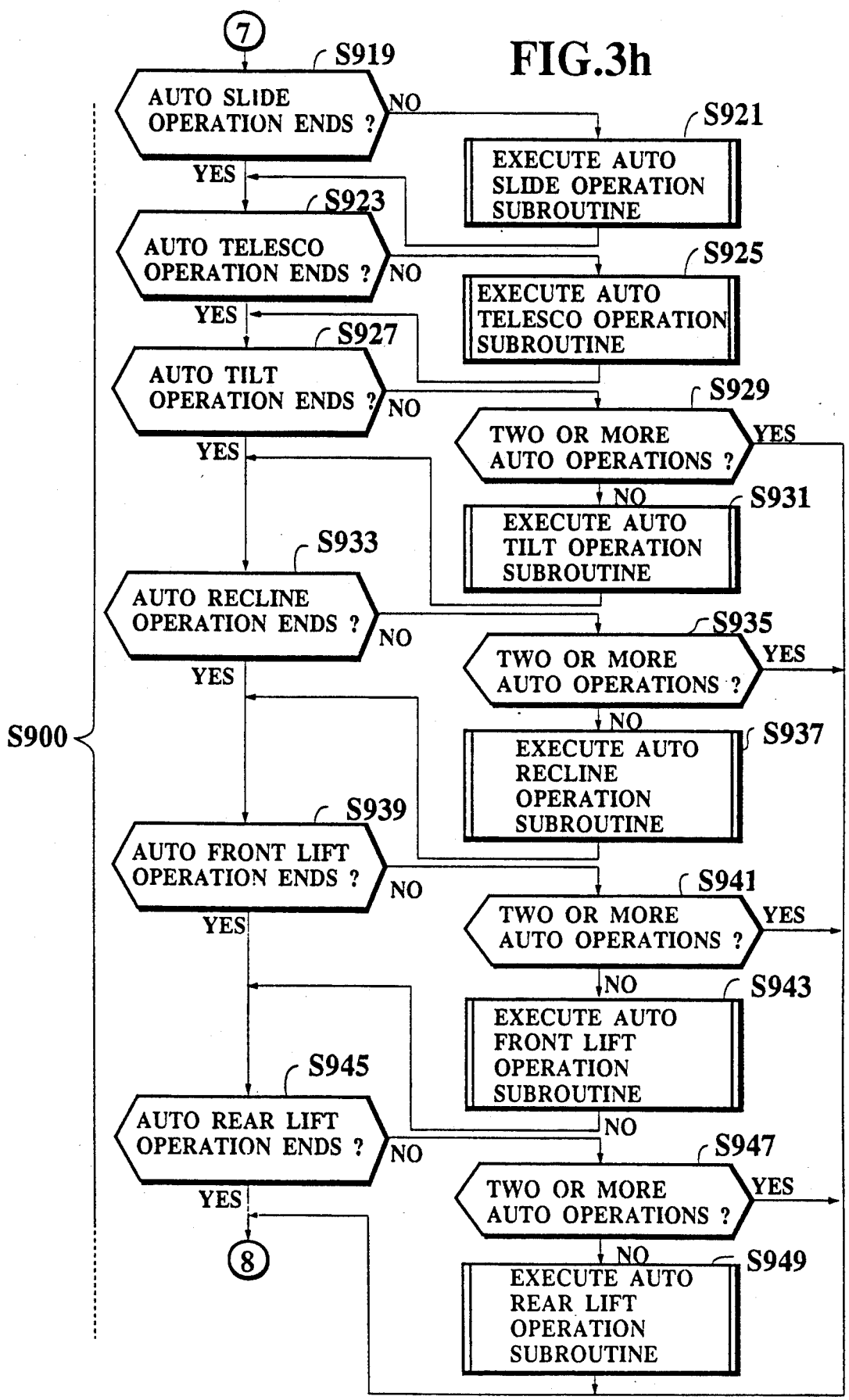
Figure 3I:
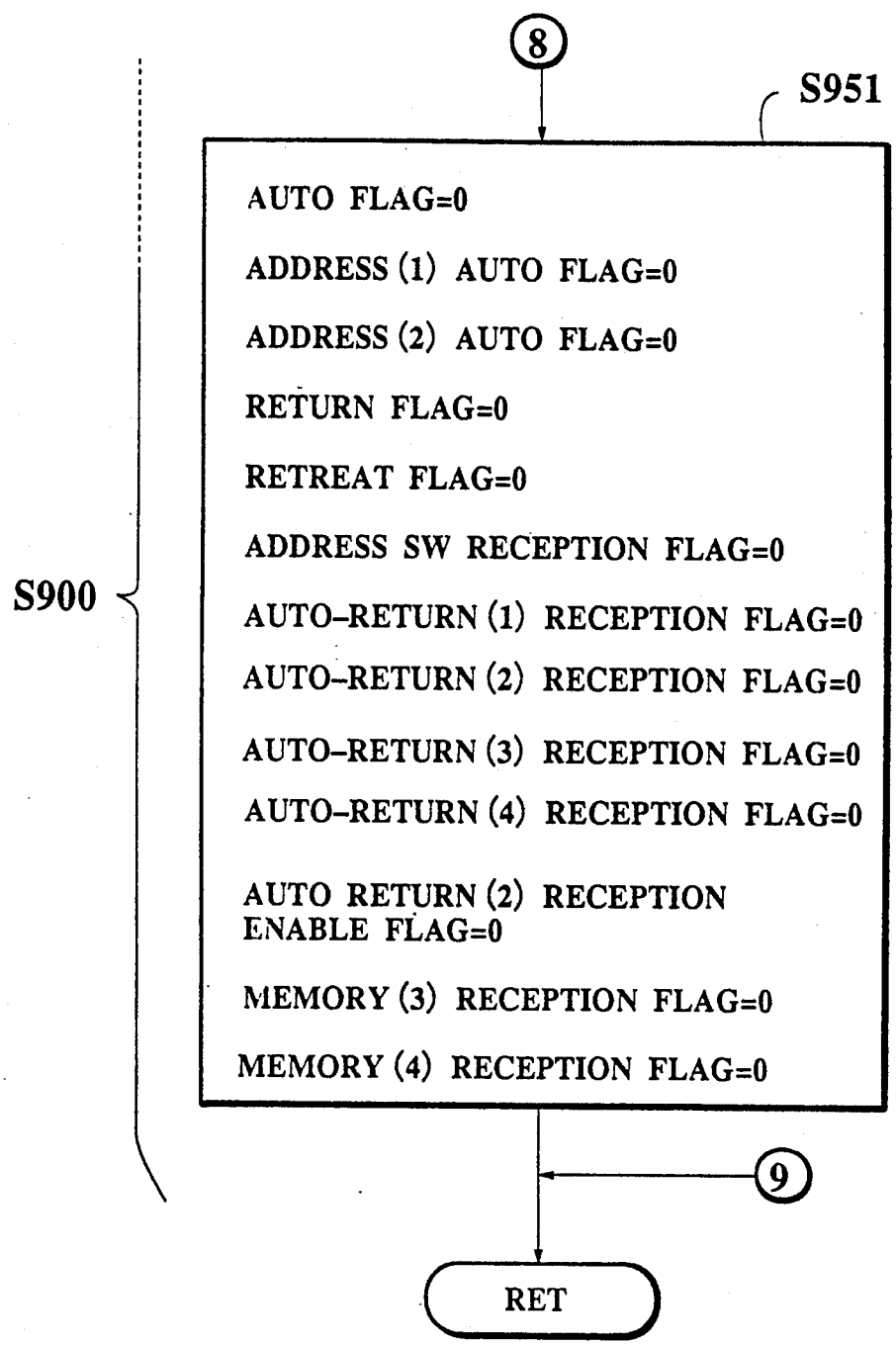

FIG. 2 is a practical circuit diagram showing an embodiment of the vehicle equipment position control system according to the present invention, which can be configured by a microcomputer (CPU).

In the system shown in FIG. 2, a microcomputer (CPU) 1 constitutes the first control means CON1, the second control means CON2, and the position storing means ME.

To this microcomputer 1, supply voltage is supplied from a supply voltage stabilizer 5 activated by a voltage of a battery 3. Further, a positive electrode of the battery 3 is connected to a first input port 9 of the microcomputer 1 via an ignition switch 7 (SW4).

In addition, there are connected to the first input port 9, a door switch 11 (SW1) turned on or off when a door is open or closed, a key switch 13 (SW2) turned on when an ignition switch is inserted into a key cylinder, an accessory switch 15 (SW3) turned on when the ignition key is set to an accessory position, and various manual switches for controlling the tilting and telescoping operation of a steering wheel. These manual switches are a tilt-up switch 17, a tilt-down switch 19, a telesco-up switch 21, and a telesco-down switch 23, in order to change the position of a steering wheel (i.e. vehicle equipment Q).

Further, a power seat switch 29 is connected to the second input port 25 of the microcomputer 1 via a receiver circuit 27 and through an address line and a data line. The power seat switch 29 includes a transmitter circuit 31 to which a set switch 33, a first address switch SW1 35, a second address switch SW2 37, a slide switch 39, a reclining switch 41, a front-lift switch 43 and a rear-lift switch 45 are connected. Further, a tilt motor 47 and a telesco motor 49 (i.e. the actuating means MO) are provided for changing the position of the steering wheel (vehicle equipment Q). A slide motor 51, a reclining motor 53, a front lift motor 55 and a rear lift motor 57 (i.e. the actuating means MO) are provided for changing the position of the power seat (vehicle equipment Q). These motors 47 to 57 are all connected to an output port 59 and the battery 3 in the same circuit configuration.

In more detail, the tilt motor 47 is connected between two relays RY1 and RY2. One terminal of each of the relays RY1 and RY2 is connected in common to the battery 3, and the other terminal of each of the relays RY1 and RY2 is connected to ground via a limit switch LSW1 or a limit switch LSW2. Each relay RY1 or RY2 is changed over in response to a relay signal output from a relay coil RL1 or RL2 connected to a power transistor Tr1 or Tr2 respectively turned on or off in response to a control signal from an output port 59.

In the same way, the telesco motor 49 is actuated by two relays RY3 and RY4, two limit switches LSW3 and LSW4, two relay coils RL3 and RL4, and two power transistors Tr3 and Tr4. The slide motor 51 is actuated by two relays RY5 and RY6, two limit switches LSW5 and LSW6, two relay coils RL5 and RL6, and two power transistors Tr5 and Tr6. The recline motor 53 is actuated by two relays RY7 and RY8, two limit switches LSW7 and LSW8, two relay coils RL7 and RL8, and two power transistors Tr7 and Tr8. The front lift motor 55 is actuated by two relays RY9 and RY10, two limit switches LSW9 and LSW10, two relay coils RL9 and RL10, and two power transistors Tr9 and Tr10. The rear lift motor 57 is actuated by two relays RY11 and RY12, two limit switches LSW11 and LSW12, two relay coils RL11 and RL12, and two power transistors Tr11 and Tr12.

Each of the motors 47 to 57 is provided with each of sensors 61 to 71 (i.e. position detecting means SC) for detecting the position of the vehicle equipment Q. Each sensor 61 to 71 is a reed switch coupled to each output shaft of each motor 47 to 57 and arranged within each gear box thereof. One terminal of each of these sensors 61 to 71 is connected in common to the ground, and the other terminal thereof is connected to a third input port 73, respectively. Therefore, whenever each motor 47 to 57 rotates, each sensor 61 to 71 generates pulse signals applied to the CPU through the third input port 73.

The driver's manual operation of steering wheel position and seat position; the storing operation of the current seat and steering wheel positions; and the transfer operation of the set seat and steering wheel positions will be described in detail below.

(a) Manual steering wheel tilt angle adjustment

When the tilt up switch 17 is depressed, a steering tilt-up signal is input to the first input port 9 of the microcomputer 1, so that the transistor Tr2 is turned on in response to an output signal from the output port 59 to energize the relay coil RL2. Therefore, the relay RY2 is changed over and power is supplied from the battery 3 to the ground by way of the contact B of the relay RY2, the tilt motor 47, the contact A of the relay RY1, and the limit switch LSW1 (UP), so that the tilt motor 47 is actuated to move the steering wheel upward.

When the tilt down switch 19 is depressed, since the transistor Tr1 is turned on to energize the relay coil RL1, the relay RY1 is changed over and power is supplied from the battery 3 to the ground by way of the contact B of the relay RY1, the tilt motor 47, the contact A of the relay RY2, and the limit switch LSW2 (DOWN), so that the tilt motor 47 is actuated to move the steering wheel downward.

The tilt position of the steering wheel is temporarily stored in a memory of the microcomputer 1 on the basis of pulses generated by the sensor 61 when the tilt motor 47 rotates.

(b) Manual steering wheel telescopic position adjustment

When the telesco up switch 21 is depressed, a steering telesco-up signal is input to the first input port 9 of the microcomputer 1, so that the transistor Tr4 is turned on in response to an output signal from the output port 59 to energize the relay coil RL4. Therefore, the relay RY4 is changed over and power is supplied from the battery 3 to the ground by way of the contact B of the relay RY4, the telesco motor 49, the contact A of the relay RY3, and the limit switch LSW3 (UP), so that the telesco motor 49 is actuated to move the steering wheel upward along the axial direction thereof.

When the telesco down switch 23 is depressed, since the transistor Tr3 is turned on to energize the relay coil RL3, the relay RY3 is changed over and power is supplied from the battery 3 to the ground by way of the contact B of the relay RY3, the telesco motor 49, the contact A of the relay RY4, and the limit switch LSW4 (DOWN), so that the telesco motor 49 is actuated to move the steering wheel downward along the axial direction thereof.

The telescopic position of the steering wheel is temporarily stored in a memory of the microcomputer 1 on the basis of pulses generated by the sensor 63 when the telesco motor 49 rotates.

(c) Manual seat front-back position adjustment

When a manual lever is pushed frontward, for instance, since the slide switch 39 is brought into contact with a front-side contact F, a seat frontward-slide signal is applied from the transmitter circuit 31 to the receiver circuit 27 through the address line and the data line and then inputted to the microcomputer 1, so that the power transistor Tr5 is turned on in response to an output signal from the output port 59 to energize the relay coil RL5. Therefore, the relay RY5 is changed over and power is supplied from the battery 3 to the ground by way of the contact B of the relay RY5, the slide motor 51, the contact A of the relay RY6, and the limit switch LSW6 (FRONT), so that the slide motor 51 is actuated to slide the seat frontward.

When the manual lever is pushed rearward, since the slide switch 39 is brought into contact with a rear-side contact R, a seat rearward-slide signal is applied from the transmitter 31 to the receiver circuit 27 through the address line and the data line and then inputted to the microcomputer 1, so that the power transistor Tr6 is turned on to energize the relay coil RL6. Therefore, the relay RY6 is changed over and power is supplied from the battery 3 to the ground by way of the contact B of the relay RY6, the slide motor 51, the contact A of the relay RY5 and the limit switch LSW5 (REAR), so that the slide motor 51 is actuated to move the seat rearward.

The front-rear position of the seat is temporarily stored in a memory of the microcomputer 1 on the basis of pulses generated by the sensor 65 when the slide motor 51 rotates.

(d) Manual seat front side up-and-down position adjustment

When the front side of the manual lever is pulled upward, since a front lift switch 43 is brought into contact with an up-side contact U, a power transistor Tr9 is turned on to energize a relay coil RL9, so that a front lift motor 55 rotates in the direction that the seat front side moves upward.

When the front side of the manual lever is pushed downward, since the front lift switch 43 is brought into contact with a down-side contact D, a power transistor Tr10 is turned on to energize a relay coil RL10, so that the front lift motor 55 rotates in the direction that the seat front side moves downward.

The up-and-down position of the seat front side is temporarily stored in the memory of the microcomputer 1 on the basis of pulses generated by the sensor 69 when the front lift motor 50 rotates.

(e) Manual seat rear side up-and-down position adjustment

When the rear side of the manual lever is pulled upward, since a rear lift switch 45 is brought into contact with an up-side contact U, a power transistor Tr11 is turned on to energize a relay coil RL11, so that a rear lift motor 57 rotates in the direction that the seat rear side moves upward.

When the rear side of the manual lever is pushed downward, since the rear lift switch 45 is brought into contact with a down-side contact D, a power transistor Tr12 is turned on to energize a relay coil RL12, so that the rear lift motor 57 rotates in the direction that the seat rear side moves downward.

The up-and-down position of the seat rear side is temporarily stored in the memory of the microcomputer 1 on the basis of pulses generated by the sensor 71 when the rear lift motor 57 rotates.

(f) Manual seat reclining position adjustment

When the upper side position of the manual lever is pushed frontward, since a recline switch 41 is brought into contact with a front-side contact F, a power transistor Tr7 is turned on to energize a relay coil RL7, so that a vehicle motor 53 rotates in the direction that the seat is reclined frontward.

When the upper side position of the manual lever is pushed rearward, since the recline switch 41 is brought into contact with a rear-side contact R, a power transistor Tr8 is turned on to energize a relay coil RL8, so that the recline motor 53 rotates in the direction that the seat is reclined rearward.

The reclining position of the seat is temporarily stored in the memory of the microcomputer 1 on the basis of pulses generated by the sensor 67 when the reclining motor 53 rotates.

(g) Set position storing operation

When the first address switch SW1 35 is depressed, data representative of the manually-adjusted seat and steering wheel drive positions now temporarily stored in the memory section of the microcomputer 1 are transferred to and stored in a memory 1 for a first driver. When the second address switch SW2 37 is depressed, data representative of the manually-adjusted seat and steering wheel drive positions now temporarily stored in the memory section of the microcomputer 1 are transferred to and stored in a memory 2 for a second driver.

The automotive seat and steering wheel return (to the drive position) and retreat (to the getting-in/out position) operation will be described hereinbelow. (a) Auto-return (1) operation (Automatic drive position return based upon data stored in memory 1 or 2)

When the first address switch SW1 35 or the second address switch SW2 37 is turned on for 300 ms+20% or more on condition that the key switch 13, the accessory switch 15 and the ignition switch 7 are all turned on, the steering wheel and the seat are automatically moved to the positions stored in the corresponding first (when SW1 35 is depressed) or second (when SW2 37 is depressed) memory 1 or 2 as far as data are stored therein. The sequence of the automatic operations are listed in Table 1 below, in which two operations of higher priority are executed simultaneously.

TABLE 1

| SEQUENCE | |
|---|---|
| 1 | Seat slide |
| 2 | Steering telesco |
| 3 | Steering tilt |
| 4 | Seat reclining |
| 5 | Seat front lift |
| 6 | Seat rear lift |

Therefore, two different drivers can move the seat and the steering wheel to the two different drive positions, respectively, so as to be fitted to each driver's body, by use of one of the address switches 35 and 37. Further, since two different seat and/or steering wheel positions are automatically moved simultaneously, the seat and the steering wheel are shifted smoothly at high speed.

(b) Auto-return (2) operation (Automatic drive position return based upon current preset equipment position)

When the first address switch SW1 35 or the second address SW2 37 is turned on before the key is operated and thereafter the door is closed, or when the first address switch SW1 35 or the second address switch SW2 37 is turned on within one minute after the door has been closed, data representative of the current seat and steering wheel positions are immediately stored in the memory 1 or 2. After these data have been stored in the memory 1 or 2 corresponding to the address switch SW1 35 or SW2 37, the seat and the steering wheel are automatically shifted to the stored positions. The operation sequence is the same as listed in Table 1.

Therefore, the driver can obtain required and predetermined drive position immediately without additional action. For instance, when the same vehicle is usually driven by man and woman; the drive position is set to that suitable for man or woman. Therefore, where the drive position is set to the woman position for instance, the man driver can immediately set the man position by turning on the first or second address switch. In other words, if this auto-return 2 function is not provided, when the man driver gets on the vehicle, since the seat and steering wheel are once set to the woman driver position, the man driver must set the man driver position by turning on the first or second address switch.

(c) Auto-return (3) operation (Automatic drive position return based upon data stored in memory 3)

By performing the following operation, the seat and steering wheel are returned automatically to a predetermined drive position.

(1) Door close mode

The seat and the steering wheel are shifted to the drive position when the door is closed, as long as the key is inserted into the key cylinder and not shifted at the accessory and ignition positions.

(2) Key insertion mode

The seat and the steering wheel are shifted to the drive position when the key is inserted into the key cylinder, as long as the key is not shifted at the accessory and ignition positions.

(3) Ignition mode

The seat and the steering wheel are shifted to the drive position when the key is shifted to the ignition position, as long as the key is inserted into the key cylinder and shifted at the accessory position.

(4) Key lock position

The seat and the steering wheel are shifted to the drive position when the door is closed and the key is shifted from the accessory position to the lock position, as long as the key is inserted into the key cylinder and not shifted at the ignition position.

In this auto-return (3) mode, since the seat and steering wheel are retreated to the getting-in/out position, the driver can easily get in the vehicle through a relatively large space formed in front of the seat. After the driver has gotten in the vehicle; however, since the seat and the steering wheel can be returned automatically to the drive position, the driver can drive the vehicle immediately.

(d) Auto-return (4) operation (Automatic retreat position return based upon data stored in memory 4)

By performing the following operation, the seat and steering wheel are retreated automatically to a predetermined getting-in/out position.

(1) Door open mode

The seat and the steering wheel are shifted to the getting-in/out position when the door is opened, as long as the key is inserted into the key cylinder but not shifted at the accessory and ignition positions.

(2) Key removal mode

The seat and the steering wheel are shifted to the getting-in/out position when the key is removed from a key accessory and ignition positions.

(3) Key lock position

The seat and steering wheel are shifted to the getting-in/out position if the door is opened when the key is shifted from the accessory position to the lock position, as long as the key is inserted into the key cylinder and not shifted at the ignition position.

In the above-mentioned auto-return modes (3) and (4), it is possible to overcome the afore-mentioned inconvenience to the drivers as follows:

(A) Door open/close mode

When the driver stops the engine by turning the ignition key to the lock position at a gasoline station for refueling without getting out of the vehicle and thereafter when he opens the door to get out of the vehicle for payment after refueling, the seat and the steering wheel are retreated to getting-in/out position, thus facilitating the exiting motion of the driver from the vehicle through a broad space. Under these conditions, when he gets in the vehicle and closes the door, the seat and the steering wheel can be returned to the drive position automatically.

Further, when the driver opens the door when the ignition key is kept set at the lock position as it would when he gets out of the vehicle at a parking place, the seat and the steering wheel are retreated to the getting-in/out position. Further, when the driver gets in the vehicle and then closes the door, the seat and the steering wheel are returned to the drive position, respectively.

Further, the above door open/close mode is basically the same as the key lock position mode when the sequence of the door open/close and the key shift operation is disregarded.

(B) Key insertion/removal mode

When the driver removes the ignition key from the key cylinder before opening the door to get out of the vehicle, the seat and steering wheel are retreated to the getting-in/out position. Further, when he enters the vehicle and inserts the ignition key into the key cylinder before closing the door, the seat and the steering wheel are returned to the drive position, irrespective of the door open/close condition, at high response speed, thus improving the operation feeling of the vehicle equipment shifting motion.

(C) Ignition mode

When the driver parks the vehicle by driving it backward to a position at which the vehicle tail end is close to a rear wall, he opens the door to stretch his head out to see behind him. In this case, however, since the ignition switch is kept turned on, the seat and the steering wheel remain in the drive position, thus allowing the driver to park the vehicle smoothly at the drive position.

(D) Door close mode and ignition mode

Further, in case the door is closed imperfectly in spite of the fact that the driver has closed the door, since the door switch is kept turned on, even if the key is inserted into the key cylinder, the seat and the steering wheel are not returned to the driving position (in door close mode), so that the driver will realize that the door is not securely closed. In this case, since the seat and the steering wheel are both returned to the driving position when the ignition switch is turned on (in ignition mode) before the door is closed perfectly, it is possible to allow the driver to quickly ignite the engine and close the door.

The above-mentioned operation will be explained in further detail with reference to a flowchart shown in FIGS. 3 to 6. In the flowchart, the memory 1 stores data representative of the drive position in response to the first address switch 35; the memory 2 stores data representative of the drive position in response to the second address switch 37; the memory 3 stores data representative of drive position; and the memory 4 stores data representative of retreat position.

The operation of the steps will be explained roughly as follows: step S100 processes the reception time of the address switches 35 and 37 after the door switch 11 has been turned on. Step S200 processes the reception time of the auto-return (2) operation after the address switches 35 and 37 have been turned on. Step S300 discriminates whether the key switch 13 is turned on or off and the ignition switch is inserted or removed. Step S400 discriminates whether the address switch 11 is on or off, the ignition switch 7 is on or off, and the accessory switch 15 is on or off. Step S500 processes the reception of the set switch 33. Step S600 processes the reception of the address switches 35 and 37. Step S700 stores the seat and steering wheel position, respectively. Step S800 processes the automatic operation reception. Step S900 processes the automatic operation.

First, when power is supplied, control starts and all the fags are cleared.

(a) Auto-return (1) operation (Memory auto-return)

The auto-return (1) operation can be executed when the driver turns on either one of the first address switch 35 or the second address switch 37, after the driver opens the door to get on the vehicle and then closes the door and further operates the ignition key to turn on the key switch 13, the accessory switch 15 and the ignition switch 7, respectively.

Since the step S100 is the address switch reception processing after the address switch has been turned on and the step S200 is the auto-return (2) reception processing after the address switch has been turned on, these steps S100 and S200 relate mainly to the Auto-return (2) operation.

Therefore, when the driver opens the door to get in the vehicle and closes the door and immediately operates the ignition key to turn on all of the following the key switch 13, the accessory switch 15, and the ignition switch 7, the step S101 for checking whether the door switch is on (the door is open) is NO and the step S103 for checking whether one minute has elapsed after the door switch is turned off (the door is closed) is NO. Further, the step S201 for checking whether the reception flag of address switch is set to 1 is NO and step S205 keeps the reception enable flag of auto-return (2) operation set at 0, so that control proceeds to step S300 to check whether the key switch is turned on or off and whether the key is removed or inserted.

In Auto-return (1) operation, since the key switch 13 and the ignition switch 7 are both on, the step S301 for checking whether the key switch is on is YES and the step S305 for checking whether the ignition switch is on is YES, so that control proceeds to step S400 to check whether the door switch 11, the ignition switch 7 and the accessory switch 15 are on or off.

Since the switches 7 (IGN), 13 (key) and 15 (ACC) are all turned on, the step S401 for checking whether the key switch is turned on is YES; the step S403 for checking whether the ignition switch is turned on is YES; and the step S405 for checking whether the accessory switch is turned on is also YES, so that control proceeds to step S500 to execute the set switch reception processing, respectively.

In Auto-return (1) operation, since the set switch 33 is not operated, the step S501 for checking whether the ignition switch is turned on is YES; the step S505 for checking whether the set switch is turned on is NO; the step S507 for checking whether 5 sec has elapsed after the set switch has been turned off is NO. The step S503 keeps the memory enable flag set at 0, so that control proceeds to step S600 to execute the address switch reception processing.

In Auto-return (1) operation, since either one of the address switch 35 or 37 is operated after the ignition switch 7 has been turned on, the step S601 for checking whether the ignition switch 7 is turned on is YES; the step S605 for checking whether the memory enable flag is at 1 is NO in correspondence to step S503; and step S611 for checking whether the address switch is turned on is YES, so that control proceeds to step S613. Here, when an address corresponding to any one of the first address switch 35 and the second address switch 37 is designated, the reception flag of auto-return (1) operation is set to 1 so that control proceeds to step S700 to store the drive position of the seat and the steering wheel.

In this case, since the set switch 33 is not operated and further the seat and the steering wheel are both shifted to the retreat position because the driver is getting in the vehicle, the step S701 for checking whether the reception flag of the memory (1 or 2) is set to "1" is NO and the step S703 for checking whether the reception flag of the memory 3 is set to "1" is also NO, so that control proceeds to step S800 to execute the automatic operation reception processing.

Since control has already received the Auto-return (1) operation, the step S801 for checking whether the reception flag of the Auto-return (2) operation is set to "1" is NO; the step S807 for checking whether the reception flag of the Auto-return (3) operation is set to "1" is NO; and the step S809 for checking whether the reception flag of the Auto-return (4) operation is also NO, so that control proceeds to step S811.

Here, since the step S811 for checking whether the reception flag of the Auto-return (1) operation is set to "1" is YES, the step S813 checks whether the designated address is "1" or the step S815 checks whether the designated address is "2". If the address 1 is designated, the step S819 sets the flag of address (1) auto-return to "1". If the address (2) is designated, the step S821 sets the flag of address (2) auto-return to "1", so that the step S823 sets auto-flag to "1" to proceeds to step S900 to execute automatic operation received at the step S800.

In the Auto-return (1) operation, address (1) or address (2) is designated. Therefore, the step S901 for checking whether the auto-flag is set to 1 is YES. Further, if address (1) is designated, the step S903 for checking whether the flag of address (1) auto-return is set to "1" is YES. If address (2) is designated, the step S903 is NO and further the step S905 for checking whether the flat of the address (2) auto-return is "1" is YES, so that control proceeds to step S919 in either case to execute the automatic return operation in accordance with data stored in the memory 1 or 2.

Step S919 checks whether the automatic seat slide operation has been completed or not. If NO, control proceeds to step S921 to execute a subroutine of the automatic seat slide operation.

Figure 4:
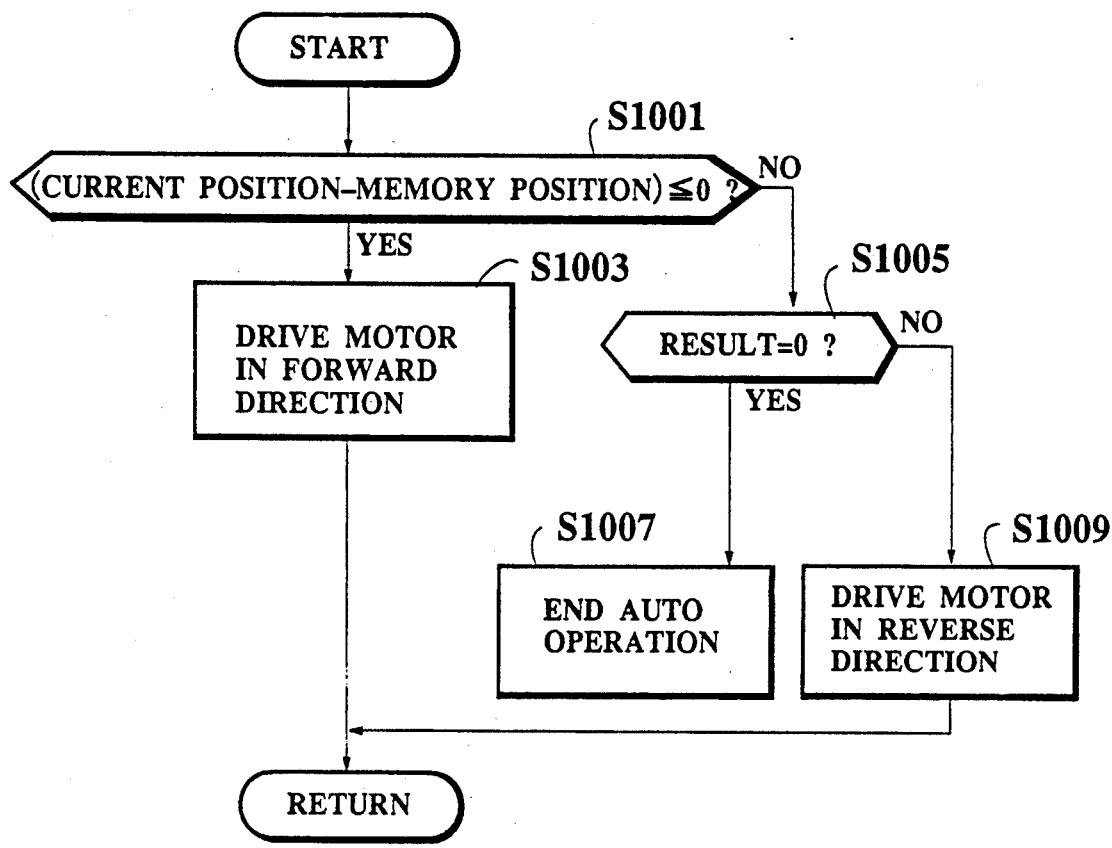
FIG. 4 is a flowchart showing the steps of the drive motor actuating operation according to the present invention.

That is, as shown in FIG. 4, step S1001 checks each difference in the seat and the steering wheel between the current position and that stored in the memory. If the memory position is larger than the current position, step S1003 drives each of the motors 47 to 57, respectively in the forward direction. If the difference is zero, the step S1005 for checking whether the check result is zero is YES, so that control proceeds to step S1007 to complete the automatic operation. If the difference is not zero, since the step S1005 is NO, control proceeds to step S1009 to drive each of the motors in the reverse direction.

In quite the same way, steps S923, S925, S927, S931, S933, S937, S939, S943, S945 and S949 are executed to perform each automatic operation of telesco and tilt motions of the steering wheel and each automatic operation of recline and front and rear lift motions of the seat.

In the above automatic operation, if each of steps S929, S935, S941 and S947 for checking whether two or more automatic operations are executed simultaneously is YES, no other automatic operation is executed. For instance, if YES in step S929, since two automatic operations of seat slide and steering wheel telescopic motions are executed simultaneously, the automatic operation of steering wheel tilting operation will not be executed.

Therefore, two automatic operations listed in Table 1 are executed simultaneously in the higher order, without providing unnatural feeling to the driver.

Figure 5:
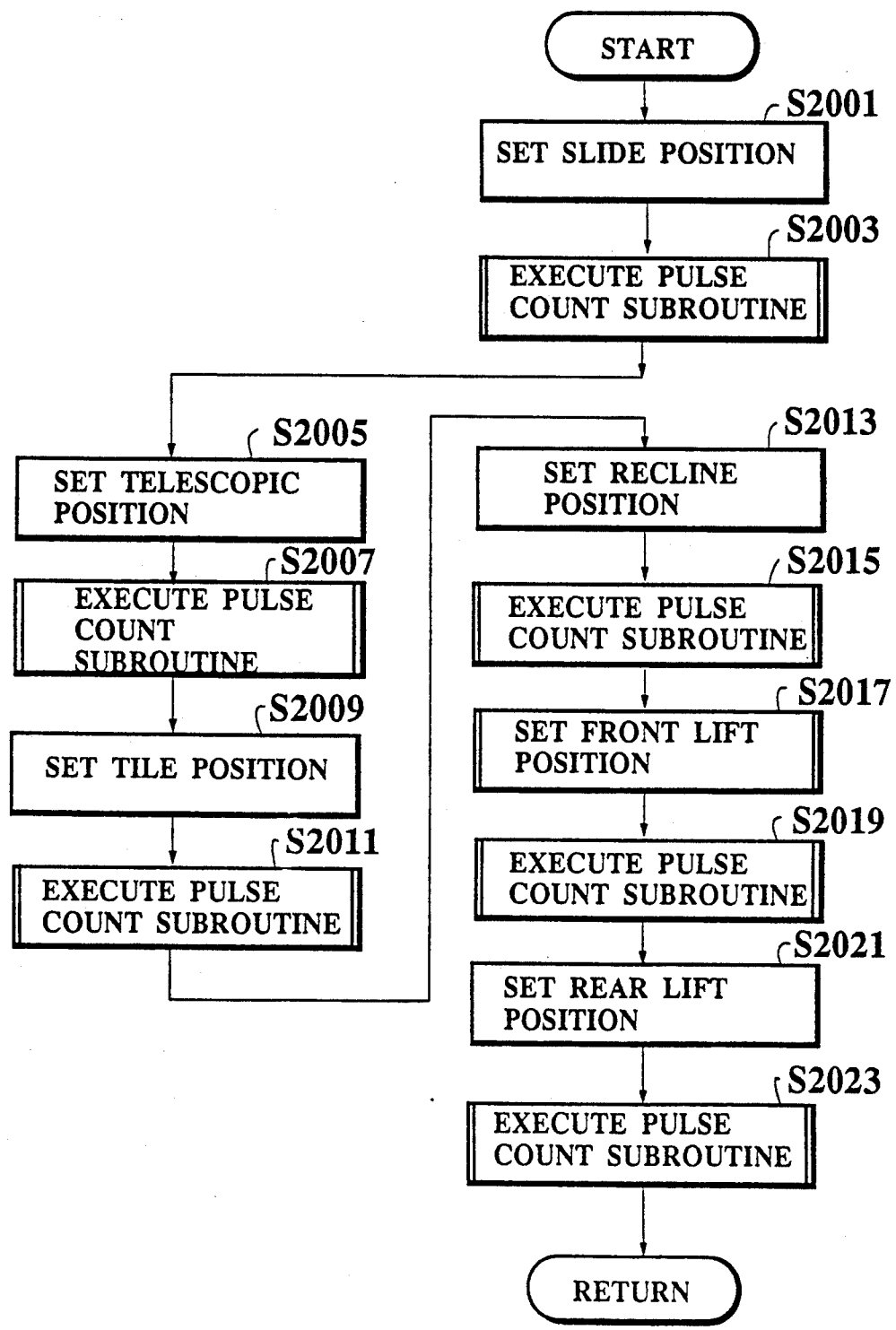
FIG. 5 is a flowchart showing the steps of the drive pulse counting operation according to the present invention.
Figure 6:
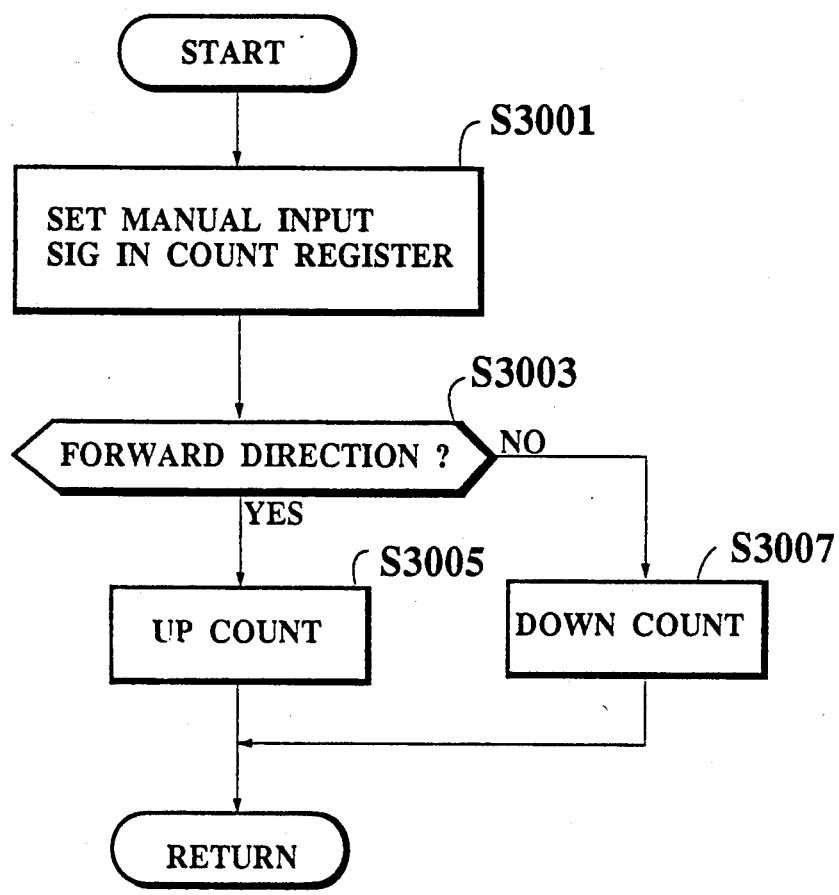
FIG. 6 is a flowchart showing the steps of the manual drive motor actuating operation according to the present invention.

When positions of the seat and the steering wheel are being shifted, control counts pulses to check the shift position as shown in FIGS. 5 and 6.

As shown in FIG. 5, if step S2001 sets the seat slide motion, step S2003 executes a pulse count subroutine corresponding thereto. Further, as shown in FIG. 6, step S3001 sets a manual input signal or an automatic output signal in a count direction register. If the position is to be shifted in the forward direction, the step S3003 for checking whether the position is shifted in the forward direction is YES, so that control proceeds to step S3005 to up-count the signals. If in the reverse direction, the step S3003 is NO, so that control proceeds to step S3007 to down-count the signal.

In quite the same way, in the case of the steering wheel telescopic motion, pulse count is executed in steps S2005 and S2007; in the case of the steering wheel tilting motion, pulse count is executed in steps S2009 and S2011; in the case of the seat reclining motion, pulse count is executed in steps S2013 and S2015; in the case of the seat front lifting motion, pulse count is executed in steps S2017 and S2019; and in the case of the seat rear lifting motion, pulse count is executed in steps S2021 and S2023, all as shown in FIG. 5. Further, step S951 clears all the flags and returns to the first step S101 shown in FIG. 3.

(b) Automatic return (2) operation (Preset auto-return)

This automatic return (2) operation can be executed (1) when the driver opens the door and operates the address switch within one minute after the door has been opened; (2) when the driver closes the door and operates the address switch within one minute after the door has been closed and further the ignition key is inserted into the key cylinder within one minute after the address switch has been turned on or further the door is closed.

When the address switch is operated immediately after the door has been opened, the step S101 for checking whether the door switch is on is YES, and the step S105 for checking whether the address switch is on is YES, so that control proceeds to step S111 to set an address switch reception flag to "1".

When the door is opened but the address switch is not operated as being parked, the step S105 is NO; the step S107 for checking whether the reception flag of address switch is set to "1" is also NO, so that control proceeds to step S109 to set the reception flag of address switch to "0". Further, when the address switch has already been operated, since the step S107 for checking whether the reception flag of address switch is set to "1" is YES, control proceeds to step S111.

Further, when the driver gets in the vehicle and closes the door and further operates the address switch within one minutes, the step S103 for checking whether one minute has elapsed after the address switch has been turned off is YES, control proceeds to step S105 to check whether the address switch is turned on.

In the auto-return (2) operation, since the reception flag of address switch is at "1", the step S201 is YES, so that control proceeds to step S203 to check whether one minute has not elapsed after the address switch has been operated. If the step S203 is YES, control proceeds to step S207 to set the reception enable flag of auto-return (2) to "1". If one minute has elapsed after the address switch has been operated, the step S203 is NO, control proceeds to step S205 to set the reception enable flag of the auto-return (2) to "1".

Further, in the auto-return (2) operation, when the ignition key is inserted after one minute has elapsed after the address switch has been operated, since the step S301 is YES, control proceeds to step S305. In this case, since the ignition key is kept inserted but not operated, the step S305 for checking whether the ignition switch is turned on is NO, and the step S309 for checking whether the accessory switch is turned on is also NO, so that control proceeds to step S311 to check whether the reception enable flag of auto-return (2) is at "1". In this case, since the step S311 is YES as in step S207, control proceeds to step S315 to set the reception flag of auto-return (2) to "1".

Therefore, the step S401 for checking whether the key switch is turned on is YES; the step S403 for checking whether the ignition switch is turned on is NO; the step for checking whether the accessory switch is on is NO; the step S411 for checking whether the address switch is on is NO; and the step S415 for checking whether the reception enable flag of auto-return (2) operation is at "1" is YES, control proceeds to step S419 to keep the reception flag of the auto-return (2) operation at "1" and then to step S501. In this auto-return (2) operation, since the ignition switch 7 is off, the step S501 is NO, so that control proceeds to step S503 to set the flag of memory enable to "0" and to the step S601.

Further, since the step S601 is NO, control proceeds to step S603 to designate an address for the auto-return (2) operation in response to the operation of the first address switch 35 or the second address switch 37.

In step S700, in the same way as in the auto-return (1) operation, the step S701 is NO and the step S703 is NO, so that control proceeds to step S801.

Here, since control determines the reception flag of auto-return (2) operation to be at "1", control checks whether the designated address is 1 or 2 in steps S803 and S805. If the address (1) is determined, control proceeds to step S819 to set the flag of address (1) auto-return to "1". If the address (2) is determined, control proceeds to step S821 to set the flag of address (2) auto-return to "1", so that control proceeds to step S823 to set the auto-flag to "1".

The succeeding procedure is quite the same as in the auto-return (1) operation; that is, the steps S901, S903, S905, S919, S921, S923, S925, S927, S929, S931, S933, S935, S937, S939, S941, S943, S945, S947, S949, and S951 are executed in accordance with data stored in memory 3 or 4.

(c) Automatic return (3) operation (Auto-return)

This automatic return (3) operation includes four various modes from (1) to (4). However, only the second mode (2) (key insertion mode) will be mainly explained hereinbelow.

In this mode, the auto-return 4 has been completed and the drive position data are already stored in memory unit 3.

Since the driver opens the door, gets in the vehicle, closes the door, and inserts the ignition key into the key cylinder, the steps S101, S103 and S201 are NO and control proceeds to step S205 to set the reception flag of address switch to "1" and to step S301.

Since the ignition key has been inserted but the ignition switch 7 and the accessory switch 15 are both turned off, the step S301 is YES but the steps S305 and S309 are both NO, so that the step S311 for checking whether the reception enable flag of the auto-return (2) operation is set to "1" is NO in correspondence to the step S205 and therefore control proceeds to step S313 to set the reception flag of the auto-return (3) operation to "1".

Further, since the key switch 13 is on and the ignition switch 7 is off, the step S401 is YES and the steps S403, S409 and S411 are all NO, so that control proceeds to step S415 for checking whether the reception enable flag of the auto-return (2) operation is set to "1" is NO in correspondence to the step S205 and therefore control proceeds to step S417 to set the reception flag of auto-return (3) operation to "1".

Since the set switch is not turned on, the step S501 is NO, so that control proceeds to step S503 to set the memory enable flag to "0" and thereafter to step S601 to check whether the ignition switch is on.

Since the ignition switch 7 is off, the step S601 is NO, so that control proceeds to step S603 to set the auto-return (2) address. However, since this mode is auto-return (3) operation, this step S603 is cleared and control proceeds to step S701. Further, since there exists no reception of memory 1, 2 or 3, the steps S701 and S703 are NO, so that control proceeds to step S801.

Since the reception flag of the auto-return (3) operation is set to "1", the step S801 is NO and the step S807 is YES, so that control proceeds to step S817 to set the retreat flag to "1" to return the seat and steering wheel to the drive position, respectively and further to step S823 to set the auto-flag to "1".

Since the step S901 is YES and steps S903 and 905 are both NO because the address switch is not turned on. Further, the step S907 for checking whether the return flag is set to "1" is YES, and then control proceeds to step S911 to execute an automatic reclining operation subroutine, an automatic front lifting operation subroutine, and an automatic rear lifting operation subroutine, and further to step S917 to execute an automatic sliding operation subroutine, an automatic telescopic operation subroutine and an automatic tilting operation subroutine. Therefore, in this auto-return (3) operation, the seat reclining and seat front and rear lifting operations are all executed simultaneously, without providing unnatural feeling to the driver, and further the seat slide and the steering wheel telescopic and tilting operation are also executed simultaneously, thus realizing a quick automatic return operation.

After the shifting operation has been completed, the step S931 clears all the flags and control returns to the step S101.

In the door close mode (1) and the key lock position mode (4) of this auto-return (3) operation, the step S401 is YES; the step S403 is NO; the step S409 is NO; and the step S415 is NO, so that control proceeds to step S417 to set the reception flag of auto-return (3) operation to "1". Further, in the ignition mode (4) of the auto-return (3) operation, the step S401 is YES; the step S403 is YES; the step S405 is YES; and the step S407 sets the reception flag of the auto-return (3) operation to "1".

(d) Automatic return (4) operation (Auto-retreat)

This automatic return (4) operation includes three modes. However, only the second mode (2) (key removal mode) will be mainly explained hereinbelow.

When the driver removes the key from the key cylinder before getting out of the vehicle, the step S101 is NO; the step S103 is NO; the step S201 is NO; the step S205 keeps the flag at "0", so that control proceeds to step S301. Since the key has been removed, the steps S301, S303 and S307 are all NO, so that control proceeds to step S317. This step S317 sets the reception flag of memory (3) to "1" to store the drive position immediately before the driver gets off the vehicle, the reception flag of memory (4) to "1" to store the retreat position, and the reception flag of the auto-return (4) operation to "1". Thereafter, control proceeds to step S401.

Since the ignition key is removed, the step S401 is NO, so that control proceeds to step S501. In this case, since the ignition key is removed and the set switch is not turned on, the step S501 is NO and step S503 keeps memory enable flag at "0", so that control proceeds to step S601.

In the auto-return (4) operation, since the address switch is not turned on, the step S601 is NO and step S603 clears the address designation of the auto-return (2) operation, so that control proceeds to step S701.

In this case, since the address switch is not turned on, the step S701 is NO and the step S703 for checking whether the reception flag of the memory (3) is set to "1" is YES in corresponding to the step S317 to store the current drive position in the memory (3) in step S705. Thereafter, the step S707 for checking whether the reception flag of the memory (4) is set to "1" is YES in correspondence with the step S317. In the case of the seat, for instance, a retreat distance of 400 mm between the current drive position and the retreat position is stored in the memory (4) as retreat data.

Since the reception flag of the auto-return (4) operation is at "1", the steps S801 and S807 are both NO; the step S809 is YES; the step S817 sets the retreat flag to "1"; the step S823 sets the auto-flag to "1", so that control proceeds to step S901.

In this case, since the retreat flag is at "1" and the auto-flag is set at "1", the step S901 is YES; the steps S903, S905 and S907 are all NO; and only the step S909 is YES.

Here, the step S911 executes simultaneously the automatic reclining operation subroutine, the automatic front lifting operation subroutine, and the automatic front lifting operation subroutine. The step S913 checks whether the automatic tilting operation is completed. If NO, the step S917 executes simultaneously the automatic sliding operation subroutine, the automatic telescopic operation subroutine and the automatic tilting operation subroutine. If YES in step S913, the step S914 completes the automatic telescopic operation and the step S951 clears all the flags, returning to the step S101.

In the door open mode (1) and the key lock position mode (3) of the auto-return (4) operation, the step S401 is YES; the step S403 is NO; the step S409 is NO; the step S411 is YES; and the step S413 sets all the reception flags of the memory (3), the memory (4) and the auto-return (4) operation to "1".

(e) Set position memory

When the driver requires to store his own seat drive position, the ignition switch 7 is turned on, the set switch 33 is turned on, and then the first address switch 35 or the second address switch 37 is turned on.

Therefore, the step S501 is YES, the step S505 is YES, and the step S507 checks whether the time is within 5 sec after the set switch has been turned off. If YES, step S509 sets the memory enable flag to "1". Since the ignition switch is turned on, the step S601 is YES, and the step S605 is YES. Further, since the address switch 35 or 37 is turned on, the step S607 is YES, and step S609 designates an address corresponding to the address switch 35 or 37 and sets the reception flag of the memory (1 or 2) to "1".

Subsequently, step S701 discriminates whether the reception flag of the memory (1 or 2) is set to "1" and steps S713 and S717 discriminate whether the designated address is 1 or 2. If the address 1 is determined, step S715 stores the current positions of the seat and the steering wheel in the memory (1) and step S716 clears the reception flag of the memory (1 or 2) and the memory enable flag. If the address (2) is determined, the step S719 stores the current position in the memory (2) and step S720 clears the reception flag of the memory (1) and the memory enable flag.

As described above, according to the present invention, the timing at which the vehicle equipment is automatically shifted from the driving position to the retreat position or vice versa is associated with the operation of the ignition key, it is possible to more preferably control the equipment position. For instance, the control method of the present invention is extremely convenient when the driver gets in to or out of the vehicle at a gasoline station; when the driver drives the vehicle backward into a at the parking place with the door left open; or when the driver parks the vehicle at a parking place with the key kept inserted into the key cylinder.

Further, since the vehicle equipment can be retreated or returned automatically by inserting or removing the ignition key into or from the key cylinder, it is possible to improve the response speed, operation feeling, etc. Further, even if the door is closed imperfectly, when the ignition key is turned on, the vehicle equipment can be returned to the driving position automatically, thus improving the convenience for the driver.

What is claimed is:

1. A vehicle equipment position control system, comprising:
    (a) vehicle equipment movable in position between a driving position and a getting-in/out position;
    (b) actuating means for actuating said vehicle equipment between the driving position and the getting-in/out position;
    (c) position detecting means for detecting vehicle equipment positions;
    (d) position storing means for storing vehicle equipment positions detected by said position detecting means;
    (e) door switch means for outputting a door-open signal when a vehicle door is opened and a door-close signal when closed;
    (f) key switch means having:
        (1) a key switch for outputting a key insertion signal when a key is inserted into the ignition key cylinder and a key-removal signal when said key is removed therefrom;
        (2) an accessory switch for outputting an accessory signal when said key is set to an accessory position and a non-accessory signal when said key is not set thereto; and
        (3) an ignition switch for outputting an ignition signal when said key is set to an ignition position and a non-ignition signal when said key is not set thereto; and
    (g) first control means connected to said door switch means and said key switch means, for controlling said actuating means so that said vehicle equipment is actuated by said actuating means to the driving position or the getting-in/out position stored in said position storing means, in response to combinations of the door open/close signals, the key insertion and removal signals, the accessory signal and the ignition signal.

2. The vehicle equipment position control system of claim 1, wherein said first control means controls said actuating means so that said vehicle equipment is actuated by said actuating means to the driving position stored by said position storing means in response to said door-open signal, when said key switch outputs a key insertion signal; said accessory switch outputs a non-accessory signal; and said ignition switch outputs a non-ignition signal.

3. The vehicle equipment position control system of claim 1, which further comprises:

second control means responsive to said key switch, for controlling said actuating means so that said vehicle equipment is actuated by said actuating means to the drive position stored by said position storing means in response to the key insertion signal and to the getting-in/out position also stored by said position storing means in response to the key removal signal, when said accessory switch outputs a non-accessory signal and said ignition switch outputs a non-ignition signal.

4. The vehicle equipment position control system of claim 1, wherein said first control means further controls said actuating means so that said vehicle equipment is actuated by said actuating means to the driving position stored by said position storing means in response to the ignition signal, when said key switch outputs a key insertion signal and said accessory switch outputs an accessory signal.

5. The vehicle equipment position control system of claim 1, wherein said first control means further controls said actuating means so that said vehicle equipment is actuated by said actuating means to the driving position stored by said position storing means in response to the non-accessory signal when said door switch outputs a door close signal, said key switch outputs a key insertion signal, and said ignition switch outputs a non-ignition signal, and to the getting-in/out position stored by said position storing means in response to the non-accessory signal when said door switch outputs a door open signal, said key switch outputs a key insertion signal, and said ignition switch outputs a non-ignition signal.

6. The vehicle equipment position control system of claim 1, which further comprises:

a set switch;
(b) a first address switch;
(c) a second address switch;
(d) a first memory for storing current vehicle equipment driving position for a first driver when said first address switch is turned on, after said set switch has been turned on; and
(e) a second memory for storing current vehicle equipment driving position for a second driver when said second address switch is turned on, after said set switch has been turned on.

7. The vehicle equipment position control system of claim 1, wherein said vehicle equipment is a vehicle seat and a steering wheel.

8. The vehicle equipment position control system of claim 7, wherein movable positions of said vehicle seat are horizontal slide position, seat front lift position, seat rear lift position, and seat back recline position.

9. The vehicle equipment position control system of claim 7, wherein movable positions of said steering wheel are tilt angle and telescopic length of the steering wheel.

10. A method of shifting vehicle equipment from a drive position to a getting-in/out position or vice versa, comprising the steps of:
(a) moving vehicle equipment to a driving position and a getting-in/out position;
(b) detecting the moved driving position and the getting-in/out position;
(c) storing the detected driving position and the detected getting-in/out position in a memory;
(d) checking whether a door is opened or closed;
(e) checking whether a key is inserted into an ignition key cylinder;
(g) checking whether said key is shifted to an ignition position;
(h) checking whether said key is shifted to a key lock position; and
(i) returning the vehicle equipment to the stored driving position or retreating the vehicle equipment to the stored getting-in/out position in response to combinations of the door open/closed condition and the ignition key positions.

11. The method of shifting vehicle equipment from a drive position to a getting-in/out position or vice versa of claim 10, wherein the vehicle equipment is shifted to the drive position when the door is closed and to the getting-in/out position when the door is opened, as long as the key is inserted into the key cylinder but not shifted at the accessory and ignition positions.

12. The method of shifting vehicle equipment from a drive position to a getting-in/out position or vice versa of claim 10, wherein the vehicle equipment is shifted to the drive position when the key is inserted into the ignition key cylinder and to the getting-in/out position when the key is removed therefrom, as long as the key is not shifted at the accessory and ignition positions.

13. The method of shifting vehicle equipment from a drive position to a getting-in/out position or vice versa of claim 10, wherein the vehicle equipment is shifted to the drive position when the key is shifted to the ignition position, as long as the key is inserted into the key cylinder and shifted at the accessory position.

14. The method of shifting vehicle equipment from a drive position to a getting-in/out position of vice versa of claim 10, wherein the vehicle equipment is shifted to the drive position if the door is closed and to the getting-in/out position if the door is opened when the key is shifted from the accessory position to the lock position, as long as the key is inserted into the key cylinder and not shifted at the ignition position.

15. The method of shifting vehicle equipment from a drive position to a getting-in/out position or vice versa of claim 10, wherein the step of storing the detected driving position comprises the steps of:
(a) inserting the ignition key into the cylinder and shifting the key to the accessory position; and
(b) turning one of two address switches to store the current driving position to one of two memory units, respectively.

16. The method of shifting vehicle equipment from a drive position to a getting-in/out position or vice versa of claim 10, wherein the step of storing the detected driving position and getting-in/out position comprises the steps of:
(a) opening and then closing the door;
(b) turning one of two address switches; and
(c) inserting the ignition key into the cylinder and shifting the key to a lock position to store the current driving position to one of two memory units, respectively.

* * * * *

UNITED STATES PATENT AND TRADEMARK OFFICE
CERTIFICATE OF CORRECTION

PATENT NO. : 5,187,665
DATED : Feb. 16, 1993
INVENTOR(S) : Futami et al.

It is certified that error appears in the above-identified patent and that said Letters Patent is hereby corrected as shown below:

On the title page, item (75) inventors should read--

Tohru FUTAMI, Fujisawa; Kazuo HIRAI, Yokohama; Shigeki TEZUKA, Tokyo and Yoshihiro UMETSU, Atsugi, all of Japan --.

Signed and Sealed this

Fifteenth Day of March, 1994

Attest:

BRUCE LEHMAN

Attesting Officer

Commissioner of Patents and Trademarks